US012090681B2

(12) United States Patent
Koike

(10) Patent No.: US 12,090,681 B2
(45) Date of Patent: Sep. 17, 2024

(54) KNIFE CARRIAGE, A ROTARY VENEER LATHE HAVING THE SAME, AND A VENEER SLICER HAVING THE SAME

(71) Applicant: Meinan Machinery Works, Inc., Obu (JP)

(72) Inventor: Masaru Koike, Obu (JP)

(73) Assignee: Meinan Machinery Works, Inc., Obu (JP)

( * ) Notice: Subject to any disclaimer, the term of this patent is extended or adjusted under 35 U.S.C. 154(b) by 440 days.

(21) Appl. No.: 17/601,004

(22) PCT Filed: Jun. 30, 2020

(86) PCT No.: PCT/JP2020/025604
§ 371 (c)(1),
(2) Date: Oct. 1, 2021

(87) PCT Pub. No.: WO2021/020001
PCT Pub. Date: Feb. 4, 2021

(65) Prior Publication Data

US 2022/0152866 A1 May 19, 2022

(30) Foreign Application Priority Data

Aug. 1, 2019 (JP) ................................ 2019-141946

(51) Int. Cl.
*B27L 5/02* (2006.01)
*B27L 5/00* (2006.01)

(52) U.S. Cl.
CPC ............... *B27L 5/025* (2013.01); *B27L 5/008* (2013.01)

(58) Field of Classification Search
CPC ............ B27L 5/02; B27L 5/025; B27L 5/008
See application file for complete search history.

(56) References Cited

U.S. PATENT DOCUMENTS 2,607,377 A * 8/1952 Merritt ..................... B27L 5/00 144/212
4,061,169 A 12/1977 Hasegawa
(Continued)

FOREIGN PATENT DOCUMENTS

AU 2006200898 A1 9/2007
CA 2538050 A1 8/2007
(Continued)

OTHER PUBLICATIONS

The Search Report from the corresponding International Patent Application No. PCT/JP2020/025604 mailed on Oct. 14, 2020.

*Primary Examiner* — Matthew Katcoff
(74) *Attorney, Agent, or Firm* — United IP Counselors, LLC

(57) ABSTRACT

A nosebar is supported by supports arranged along the longitudinal direction, and the supports are assembled to fixtures to swing independently of each other in a direction away from a log according to the reaction force of the pressing force acting on the supports. Thus, when a knife peels a knot part of the log or a fragment of the log enters a cutting edge, the portion of the nosebar pressing the knot part or corresponding to the location where the fragment enters the cutting edge is greatly deformed, while the deformation of the nosebar in the other portions is kept small. A corner of the nosebar is prevented from contacting the peeled portion of the raw wood and generating a gap when the nosebar is bent and deformed.

20 Claims, 28 Drawing Sheets

(56) References Cited

U.S. PATENT DOCUMENTS

| | | | | |
|---|---|---|---|---|
| 4,494,589 | A * | 1/1985 | Kajikawa ................ | B27L 5/025 144/365 |
| 4,753,278 | A * | 6/1988 | Lorenzo .................. | B27L 5/025 144/365 |
| 5,662,151 | A | 9/1997 | Koike | |
| 6,357,496 | B1 * | 3/2002 | Koike .................... | B27D 1/005 144/365 |
| 2007/0209735 | A1 | 9/2007 | Mawatari | |

FOREIGN PATENT DOCUMENTS

| | | | |
|---|---|---|---|
| EP | 1825976 | A1 | 8/2007 |
| JP | S51100398 | A | 9/1976 |
| JP | S54-141096 | U | 3/1978 |
| JP | S5384299 | A | 7/1978 |
| JP | S5571503 | A | 5/1980 |
| JP | H10180719 | A | 7/1998 |
| JP | 2001079811 | A | 3/2001 |
| JP | 2005169776 | A | 6/2005 |

* cited by examiner

KNIFE CARRIAGE, A ROTARY VENEER LATHE HAVING THE SAME, AND A VENEER SLICER HAVING THE SAME

CROSS-REFERENCE TO RELATED APPLICATIONS

This application is the U.S. National Phase of International Application No. PCT/JP2020/025604, filed Jun. 30, 2020, which claims priority to Japanese Patent Application No. 2019-141946, filed Aug. 1, 2019. The contents of both of those applications are incorporated by reference herein in their entirety.

TECHNICAL FIELD

The present invention relates to a knife carriage configured to have a long knife arranged in a direction orthogonal to both the axial direction and of a pair of cutting spindles and the vertical direction so as to face a log held between the pair of cutting spindles, the knife being configured so as to peel a veneer from the log held between the pair of cutting spindles. The knife carriage is also configured to have a long pressure bar for pressing a peeled portion of the veneer out of the log from the side opposite to the side where the knife is arranged with respect to the peeled portion. The present invention also relates to a rotary veneer lathe having the knife carriage and a veneer slicer having the knife carriage.

BACKGROUND ART

Japanese Utility Model Laid-Open No. 54-141096 describes a long pressure bar capable of suppressing the occurrence of cracks in a veneer. When a veneer is peeled out from a log with a knife while the log is rotatably held between cutting spindles, the pressure bar suppresses the occurrence of cracks in the veneer by pressing a peeled portion of the veneer from the side which is opposite to the side where the knife is arranged with respect to the peeled portion.

The pressure bar is divided into plural pieces along the longitudinal direction and attached to a pressure bar mount. This configuration allows the pressure bar to bend partially when the knife peels a knot part of the log or when a fragment or chip of the log enters the cutting edge, avoiding excessive pressing against the peeled portion by the pressure bar. As a result, it is possible to prevent the knot part from destruction and to prevent the knife from clogging due to the fragment or chip (including a powdery wood chip) of the log entering the cutting edge. Thus, the occurrence of rough surfaces of the veneer and the occurrence of thickness unevenness of the veneer are prevented, improving the quality of the veneer. Further, there occurs no problem that the accumulation of the powdery wood chips at the cutting edge would stop the peeling of the veneer.

However, in the pressure bar described in the above-mentioned publication, when the pressure bar is partially bent, the corner of the pressure bar that presses the peeled portion of the log without bending, more specifically, the corner of a chip attached to the pressure bar may come into contact with the peeled portion and damage the peeled veneer. Further, in the case of using the pressure bar described in the above-mentioned publication to peel a veneer from a log containing water, when the peeled portion is pressed by the pressure bar, the water seeping out from the peeled portion may flow out of a gap generated between the bent pressure bar and the non-bent pressure bar, which may make a linear stain adhere to the peeled veneer. Thus, the pressure bar described in the above-mentioned publication has room for improvement in terms of further enhancing the quality of the veneer to be peeled out.

The present invention has been made in view of the above, and it is an object of the present invention to provide a knife carriage that contributes to further enhancement in the quality of a veneer, a rotary veneer lathe having the knife carriage, and a veneer slicer having the knife carriage.

BRIEF SUMMARY

A knife carriage of the present invention, a rotary veneer lathe having the same, and a veneer slicer having the same use the following means to achieve the above-described object.

According to a preferred embodiment of the present invention, a knife carriage is configured to have a long knife and at least one long pressure bar, the knife being disposed to face wood including a log for peeling a veneer from the wood, the pressure bar configured to press a peeled portion of the veneer from a side opposite to the side where the knife is disposed with respect to the peeled portion. The knife carriage includes a knife mount, a pressure bar mount, and a support member. The knife mount extends in the longitudinal direction of the knife so that the knife is attached to it. The pressure bar mount is located above the knife mount and extends in the longitudinal direction of the pressure bar so that the pressure bar is attached to it. The support member is disposed between the pressure bar and the pressure bar mount for supporting the pressure bar. The support member includes at least one fixture to be fixed to the pressure bar mount, and first and second supports to be supported by the fixture in a state separated from each other in the extending direction of the pressure bar so as to support the pressure bar at both ends of the pressure bar. The first and second supports are supported by the fixture to be movable independently of each other in the direction away from the wood according to the magnitude of the reaction force of a pressing force of the pressure bar against the peeled portion, the reaction force acting on the first and second supports via the pressure bar. Here, the "move" in the present invention preferably means not only a mode in which the first and second supports entirely move, but also a mode in which the first and second supports partially move due to their swinging or deformation.

According to the present invention, the first and second supports are able to move independently of each other in the direction away from the wood, according to the magnitude of the reaction force of a pressing force acting on the first and second supports via the long pressure bar. Thus, the long pressure bar can be partially deformed (bent). In other words, when a knife peels a knot part of the log, or when a fragment or chip of the wood (including powdered wood chips) enters the cutting edge, the long pressure bar does not deform uniformly. The portion of the long pressure bar that presses the part where the wood knot part is present or the part corresponding to where the wood fragments or chips enter the cutting edge is able to greatly deform, while the other portion of the pressure bar is maintained with small deformation. As a result, the peeled portion can be pressed with an appropriate pressing force without being excessively pressed by the pressure bar. Further, according to the present invention, unlike a conventional pressure bar where the small pieces of the divided pressure bar do not deform independently from each other, when a veneer is peeled out while pressing the peeled portion of the wood with the pressure bar, the corner of small deformed pieces (i.e., the portions where three ridges constituting the pressure bar intersect) does not come into contact with the peeled portion of the wood and do not damage the peeled veneer. Further, even in the case of peeling a veneer from wood containing water, when the peeled portion is pressed by the pressure bar, and no water seeping out from it flows out of a gap between a bent piece and a non-bent one of the pressure bar. Thus, the veneer to be peeled will have no scratching nor linear stain on it. As a result, any degradation in quality of the resulting veneer can be well prevented. Also, there occurs no problem that the accumulation of the powdery wood chips at the cutting edge would stop the peeling of the veneer.

According to another embodiment of the knife carriage of the present invention, the support member further includes first and second fulcrum shafts for swingably supporting the first and second supports respectively relative to the fixture. The first and second fulcrum shafts are arranged parallel to the longitudinal direction of the pressure bar. The first and second supports include first and second ends that are supported by the first and second fulcrum shafts, third and fourth ends for supporting the pressure bar, and first and second connecting portions for connecting the first and second ends to the third and fourth ends.

According to the above-described embodiment, the first and second supports are movable with the simple configuration in the direction away from the wood.

According to another embodiment of the knife carriage of the present invention, first and second urging members are arranged between the third and fourth ends and the fixture and configured to urge the pressure bar in a direction away from the fixture via the first and second supports.

According to the above-described embodiment, even when the pressure bar moves in the direction away from the wood, the first and second urging members move the pressure bar to the original position (posture) with their restoring force. Thus, the peeled portion can be stably pressed with an appropriate pressing force.

According to another embodiment of the knife carriage of the present invention, the first and second ends have first and second extending portions that extend on the side, with respect to the first and second fulcrum shafts, opposite to the side where the third and fourth ends are arranged. Between the first and second extending portions and the fixture, third and fourth urging members are arranged for urging the pressure bar in a direction away from the fixture via the first and second supports.

According to the above-described embodiment, even when the pressure bar moves away from the wood, the third and fourth urging members are able to return the pressure bar to the original position (posture) by their restoring force. Thus, the peeled portion can be stably pressed with an appropriate pressing force. In addition, since the third and fourth urging members are arranged in the first and second extending portions, maintenance such as replacement of the first and second urging members is facilitated.

According to another embodiment of the knife carriage of the present invention, the first and second fulcrum shafts support first and second rollers on them, respectively. The first and second supports have a substantially L-shape in which the first and second ends are orthogonally connected to the first and second connecting portions. The first and second supports are also arranged to be in contact with the first and second rollers at their internal corners, respectively. The support member includes first and second bolts capable of fastening the first and second supports to the fixture and further includes fifth and sixth urging members disposed between the first and second supports and the first and second bolts for urging the first and second supports toward the first and second rollers.

According to the above-described embodiment, since the first and second supports are only urged toward the first and second rollers by the urging forces of the fifth and sixth urging members, the first and second supports are swingable about the first and second fulcrum shafts with respect to the fixture, and also ones of both end edge portions of the first and second supports in the axial direction of the first and second fulcrum shafts are swingable in a direction away from the first and second fulcrum shafts. Accordingly, the pressure bar becomes deformable more flexibly. As a result, the peeled portion can be more effectively pressed with an appropriate pressing force.

According to another embodiment of the knife carriage of the present invention, seventh and eighth urging members are arranged between the first and second supports and the fixture, for urging the pressure bar in a direction away from the fixture via the first and second supports.

According to the above-described embodiment, even when the pressure bar moves away from the wood, the seventh and eighth urging members are able to return the pressure bar to the original position (posture) by their restoring force. Thus, the peeled portion can be stably pressed with an appropriate pressing force.

According to the above-described embodiment, the first and second supports include fifth and sixth ends that are fixed to the fixture, and seventh and eighth ends that are free ends, without being fixed to the fixture, for supporting the pressure bar.

According to the above-described embodiment, the first and second supports are movable, with the simple configuration, in a direction away from wood. Further, even when the pressure bar moves in a direction away from the wood, the first and second supports return the pressure bar to the original position (posture) by their elastic force. Thus, the peeled portion can be stably pressed with an appropriate pressing force.

According to another embodiment of the knife carriage of the present invention, the movement rigidity of the first and second supports in a direction away from the wood is equal to or greater than the bending rigidity of the pressure bar. Here, the "movement rigidity" in the present invention is defined as the difficulty of the first and second supports for moving in a direction away from the wood.

According to the above-described embodiment, as the first and second supports move away from the wood, the pressure bar is able to effectively follow the movement of the first and second supports. Accordingly, excessive pressing against the peeled portion by the pressure bar can be more effectively suppressed.

According to another embodiment of the knife carriage of the present invention, the support member further includes a third support to be supported by the fixture at a position between the first and second supports. The third support is capable of supporting the pressure bar and is supported by the fixture so as to be movable in a direction away from the wood according to the magnitude of a reaction force of the pressing force acting on the third support via the pressure bar.

According to the above-described embodiment, since the pressure bar has three support points, the pressure bar can be deformed (bent) to the third order. That is, the pressure bar can produce finer partial deformation. Thus, the peeled portion can be pressed with a more appropriate pressing force without being excessively pressed.

According to another embodiment of the knife carriage of the present invention, the support member further includes a third fulcrum shaft capable of swingably supporting the third support with respect to the fixture. The third fulcrum shaft is arranged parallel to the longitudinal direction of the pressure bar. The third support includes a ninth end supported by the third fulcrum shaft, a tenth end capable of supporting the pressure bar, and a third connecting portion for connecting between the ninth end and the tenth end.

According to the above-described embodiment, the third support is movable, with the simple configuration, in a direction away from the wood.

According to another embodiment of the knife carriage of the present invention, a ninth urging member is disposed between the tenth end and the fixture for urging the pressure bar in a direction away from the fixture via the third support.

According to the above-described embodiment, even when the pressure bar moves in a direction away from the wood, the ninth urging member can return the pressure bar to the original position (posture) by the restoring force of the ninth urging member. Thus, the peeled portion can be stably pressed with an appropriate pressing force.

According to another embodiment of the knife carriage of the present invention, the ninth end has a third extending portion that extends on a side opposite to a side where the tenth end is disposed with respect to the third fulcrum shaft. Between the third extending portion and the fixture, a tenth urging member is disposed for urging the pressure bar in a direction away from the fixture via the third support.

According to the above-described embodiment, even when the pressure bar moves away from the wood, the tenth urging member is able to return the pressure bar to the original position (posture) by the restoring force of the tenth urging member. Thus, the peeled portion can be stably pressed with an appropriate pressing force. In addition, since the tenth urging member is arranged in the third extending portion, maintenance such as replacement of the tenth urging member is facilitated.

According to another embodiment of the knife carriage of the present invention, the third fulcrum shaft supports a third roller. The third support has a substantially L-shape in which the ninth end is orthogonally connected to the third connecting portion and is located so that an inner corner of the third support is in contact with the third roller. The support member further includes a third bolt capable of fastening the third support to the fixture and an eleventh urging member disposed between the third support and the third bolt for urging the third support toward the third roller.

According to the above-described embodiment, since the third support is only urged by the third roller with the urging force of the eleventh urging member, the third support is able to swing about the third fulcrum shaft with respect to the fixture, and also one of both end edge portions of the third support in the axial direction of the third fulcrum shaft is swingable in a direction away from the third fulcrum shafts. Accordingly, the pressure bar becomes deformable more flexibly. As a result, the peeled portion can be more effectively pressed with an appropriate pressing force.

According to another embodiment of the knife carriage of the present invention, a twelfth urging member is disposed between the third support and the fixture for urging the pressure bar in a direction away from the fixture via the third support.

According to the above-described embodiment, even in the case where the pressure bar moves in a direction away from the wood, the twelfth urging member is able to return the pressure bar to the original position (posture) by the restoring force of the twelfth urging member. Thus, the peeled portion can be stably pressed with an appropriate pressing force.

According to another embodiment of the knife carriage of the present invention, the third support has an eleventh end to be fixed to the fixture and a twelfth end as a free end, which is not fixed to the fixture, for supporting the pressure bar.

According to the above-described embodiment, the third support can move in a direction away from the wood with a simple configuration. Further, even when the pressure bar moves in a direction away from the wood, the third support can return the pressure bar to the original position (posture) by the elastic force of the third support itself. Thus, the peeled portion can be stably pressed with an appropriate pressing force.

According to another embodiment of the knife carriage of the present invention, the moving rigidity of the third support in the direction away from the wood is set to be equal to or greater than the bending rigidity of the pressure bar. Here, the "movement rigidity" in the present invention is defined as the difficulty of the third support moving away from the wood.

According to the above-described embodiment, the pressure bar can effectively follow the movement of the third support when the third support moves in a direction away from the wood. Thus, excessive pressing against the peeled portion by the pressure bar can be more effectively suppressed.

According to another embodiment of the knife carriage of the present invention, the pressure bar is composed of first and second pressure bars arranged in the longitudinal direction. The first support is able to support one end of the first pressure bar in the longitudinal direction. The second support is able to support one end of the second pressure bar in the longitudinal direction. The third support is able to support the other ends of the first and second pressure bars in the longitudinal direction.

According to the above-described embodiment, the support is facilitated to move in a direction away from the wood when the support supports a part of the pressure bar for pressing wood having a knot or a part of the pressure bar handling where a fragment or chip of the wood enters the cutting edge. At the same time, it is possible to reliably prevent the support that supports the other parts from moving away from the wood. Thus, the peeled portion can be pressed with an appropriate pressing force without being excessively pressed by the pressure bar. The other ends of the first and second pressure bars in the longitudinal direction are both supported by the third support, and thereby it is impossible that only one of the other ends of the first and second pressure bars in the longitudinal direction is deformed. For this reason, there is no possibility that one of the other ends in the longitudinal direction of the first and second pressure bars (i.e., the portions where the three ridgelines constituting the first and second pressure bars intersect) comes in contact with a veneer peeled out and damages it. Further, since the pressure bar is composed of plural bars in the longitudinal direction, each of the first and second pressure bars can be exchanged separately, which is reasonable.

According to another embodiment of the knife carriage of the present invention, the first and second pressure bars are supported by the third support in a state where the other ends of the first and second pressure bars in the longitudinal direction are in contact with each other.

According to the above-described embodiment, the first and second pressure bars are supported by the third support in a state where the other ends in the longitudinal direction of the first and second pressure bars are in contact with each other. Thus, even if the first and second pressure bars are deformed while the first, second, and third supports are moving away from the wood, it is possible to favorably suppress the formation of a gap between the first and second pressure bars. Thus, even when the veneer is peeled out from the wood containing water, the water seeping out from the peeled portion due to the pressing against the peeled portion by the pressure bar does not flow to the peeled veneer. As a result, the quality of a veneer to be peeled is not degraded due to linear stains on the veneer.

According to a preferred embodiment of a rotary veneer lathe of the present invention, a rotary veneer lathe for peeling veneers from a log is configured. The rotary veneer lathe includes a pair of cutting spindles capable of holding a log, a machine frame, and a knife carriage of any one of the above embodiments according to the present invention, the knife carriage being arranged in a direction orthogonal to both of the axial direction of the pair of cutting spindles and the vertical direction so as to face a log held between the spindles. The machine frame has a pair of vertical walls that rotatably support the pair of cutting spindles, and a pedestal connecting the pair of vertical walls.

A rotary veneer lathe of the present invention is equipped with a knife carriage of any one of the above aspects according to the present invention. Therefore, a rotary veneer lathe according to the present invention provides the effects similar to those from the knife carriage of the present invention, including: the effect of achieving both the securing of the proper pressing against the peeled portion of a veneer by the pressure bar and the suppression of the excessive pressing against the peeled portion by the pressure bar; the effect of preventing damage to the veneer by the corner of the pressure bar (the portion where three ridges that constitute the pressure bar intersect) coming into contact with the peeled portion; and the effect of preventing water from flowing out to the veneer and linear stains from attaching to the veneer when the veneer is peeled out from a log containing water, the water seeping out of the peeled portion due to pressing by the pressure bar against the peeled portion.

According to a preferred embodiment of a rotary veneer lathe of the present invention, a veneer slicer for peeling veneers from wood is configured. The veneer slicer includes a holding member capable of holding a wood, a machine frame, a knife carriage of any one of the above aspects according to the present invention. The machine frame has a pair of vertical walls that support the holding member, and a pedestal connecting between the pair of vertical walls. The knife carriage is arranged to face the wood held by the holding member.

A veneer slicer of the present invention is equipped with a knife carriage of any one of the above aspects according to the present invention. Therefore, a veneer slicer according to the present invention provides the effects similar to those from the knife carriage of the present invention, including: the effect of achieving both the securing of the proper pressing against the peeled portion of a veneer by the pressure bar and the suppression of the excessive pressing against the peeled portion by the pressure bar; the effect of preventing damage to the veneer by the corner of the pressure bar (the portion where three ridges that constitute the pressure bar intersect) coming into contact with the peeled portion; and the effect of preventing water from flowing out to a veneer and linear stains from attaching to the veneer when the veneer is peeled out from a log containing water, the water seeping out of the peeled portion due to pressing by the pressure bar against the peeled portion.

According to the above-described embodiments, the quality of the veneer can be further enhanced.

DETAILED DESCRIPTION

Next, the best embodiment for carrying out the present invention will be described using examples.

Figure 1:
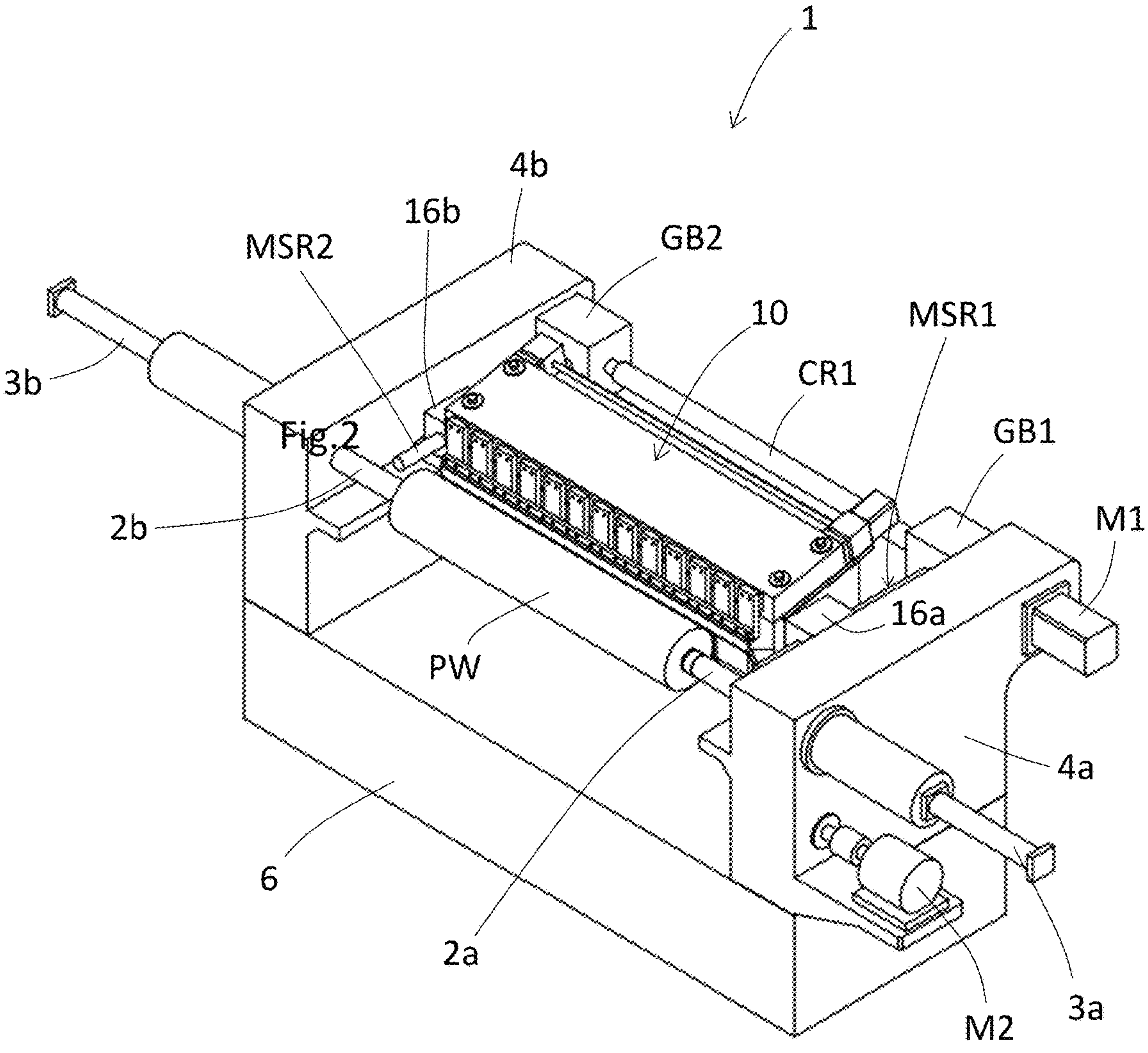
FIG. 1 is a schematic configuration diagram illustrating an outline of a configuration of a rotary veneer lathe 1 including a knife carriage 10 according to an embodiment of the present invention.

As shown in FIG. 1, a rotary veneer lathe 1 according to an embodiment of the present invention includes a pair of support frames 4*a*, 4*b* having a pair of cutting spindles 2*a*, 2*b*, and a base frame 6 for connecting the pair of support frames 4*a*, 4*b*, and a knife carriage 10 of an embodiment of the present invention that is disposed between the pair of support frames 4*a* and 4*b* and above the base frame 6. The pair of support frames 4*a*, 4*b* correspond to "vertical walls" in the present invention, and the base frame 6 is an example of an embodiment corresponding to a "pedestal" in the present invention. The pair of support frames 4*a* and 4*b* and the base frame 6 are an example of an embodiment corresponding to the "machine frame" of the present invention.

As shown in FIG. 1, the pair of cutting spindles 2*a* and 2*b* are arranged coaxially and in such a manner that the tips are opposed to each other, and are movable in directions approaching and away from each other by hydraulic cylinders 3*a* and 3*b*. The pair of cutting spindles 2*a*, 2*b* hold a log PW between them by moving in the direction approaching each other, and release the log PW by moving in the direction away from each other. The cutting spindle 2*a* is rotated by a motor M2 described later. Rotation of the cutting spindle 2*a* rotates the log PW held between the pair of cutting spindles 2*a* and 2*b*.

As shown in FIG. 1, the support frame 4*a* includes a motor M1, a gearbox GB1 connected to a rotation shaft (not shown) of the motor M1, and the motor M2 for rotating the cutting spindle 2*a*. An externally threaded rod MSR1 is connected to the gearbox GB1. Further, a gearbox GB2 is attached to the support frame 4*b*. An externally threaded rod MSR2 is connected to the gearbox GB2. The gearbox GB1 and the gearbox GB2 are connected by a connection shaft CR1. That is, rotation of the rotating shaft (not shown) of the motor M1 is transmitted to the externally threaded rod MSR1 via the gearbox GB1, and is also transmitted to the externally threaded rod MSR2 via the connection shaft CR2 and the gearbox GB2.

Figure 2:
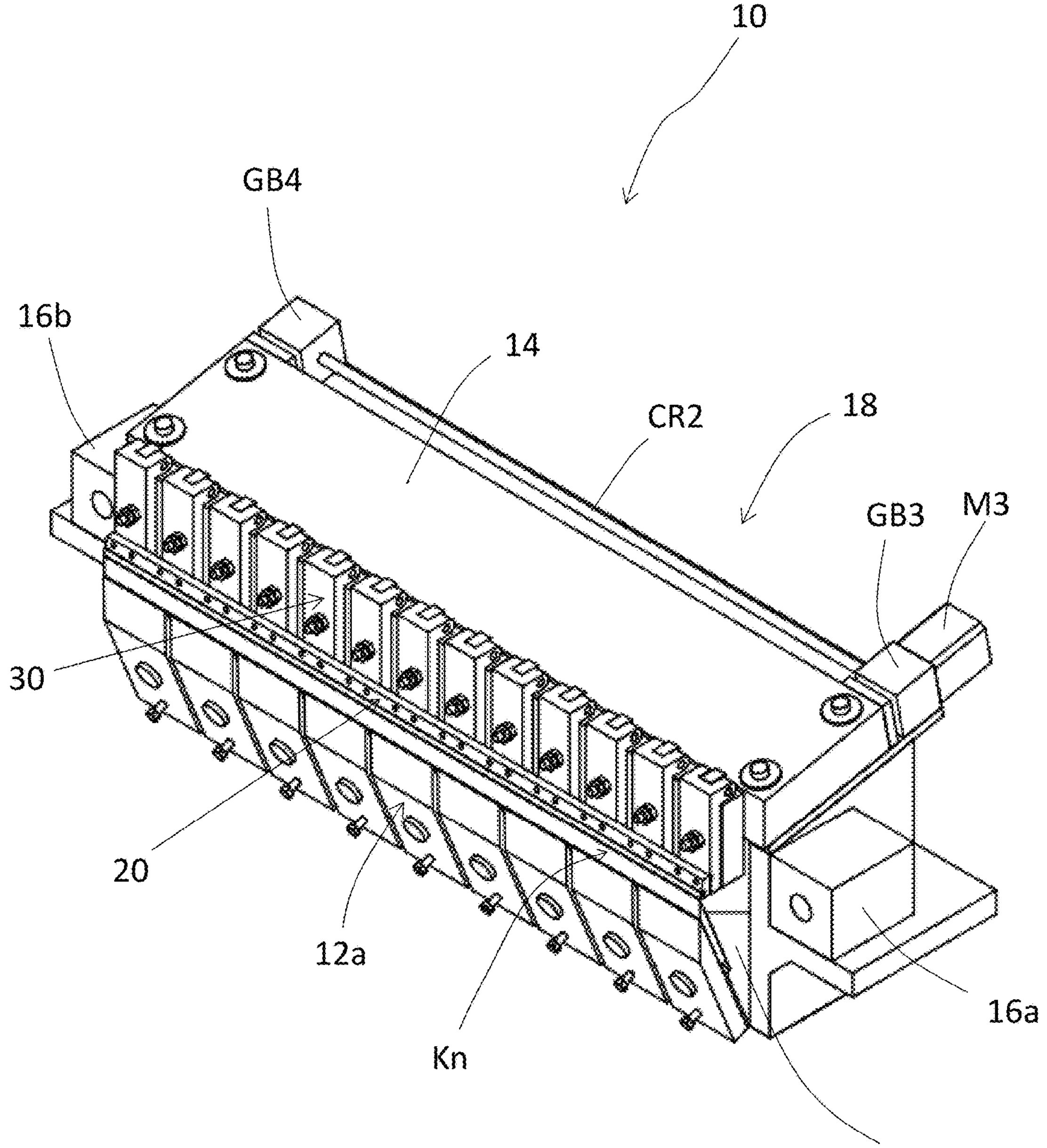
FIG. 2 is a perspective view schematically illustrating a configuration of the knife carriage 10 according to an embodiment of the present invention.
Figure 3:
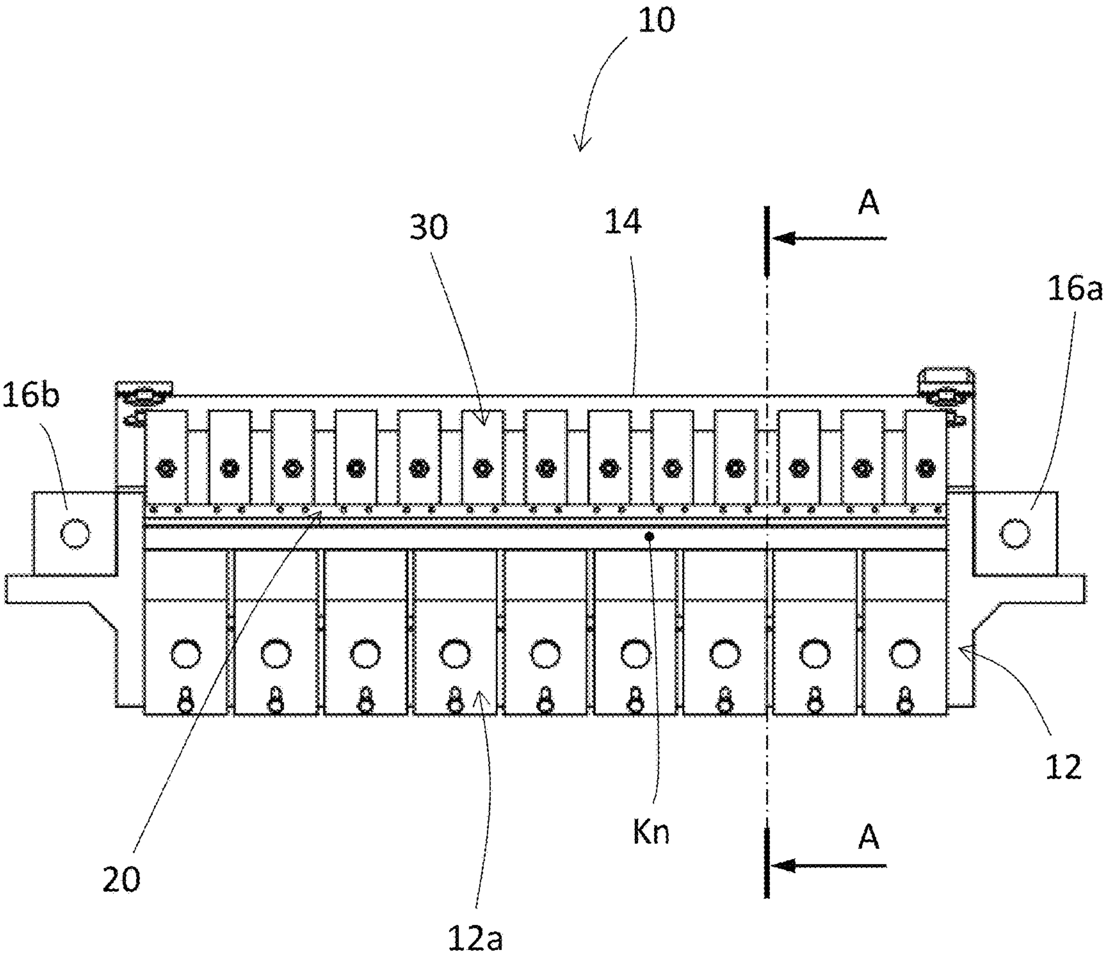
FIG. 3 is a front view of the knife carriage 10 according to an embodiment of the present invention as viewed from the side where a log PW is placed.
Figure 10:
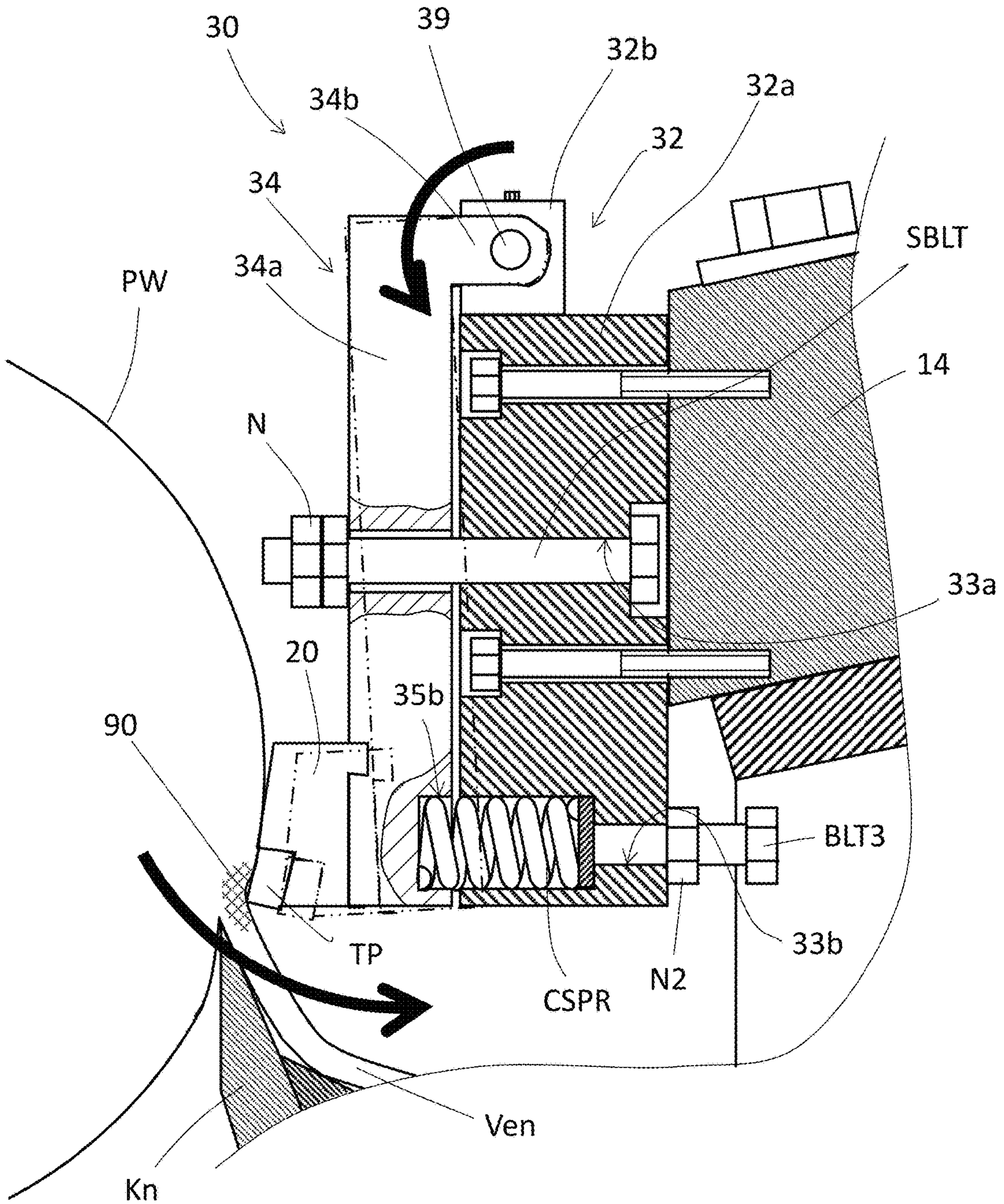
FIG. 10 is an explanatory view illustrating a state in which a veneer Ven is peeled out from a log PW while pressing a peeled portion 90 with the nosebar 20.

The knife carriage 10 according to the embodiment of the present invention is configured as a mount for mounting a knife Kn and a long nosebar 20 for peeling out a veneer Ven from the log PW (see FIG. 10). As shown in FIGS. 2 and 3, the knife carriage 10 includes a knife mount 12 for holding the knife Kn, a support member 30 for supporting the nosebar 20, a nosebar mount 14 disposed above the knife mount 12, and a pair of internally threaded bodies 16*a*, 16*b* for screwing with the externally threaded rods MSR1, MSR2 of the support frames 4*a*, 4*b*.

As shown in FIG. 1, the knife carriage 10 is supported by the pair of support frames 4*a*, 4*b* in a state where the externally threaded rods MSR1, MSR2 of the pair of support frames 4*a*, 4*b* are engaged with the pair of internally threaded bodies 16*a*, 16*b*, and the knife carriage 10 is moved in a direction approaching or away from the cutting spindles 2*a*, 2*b* (the log PW) when the externally threaded rods MSR1, MSR2 are rotated by the motor M1.

Figure 4:
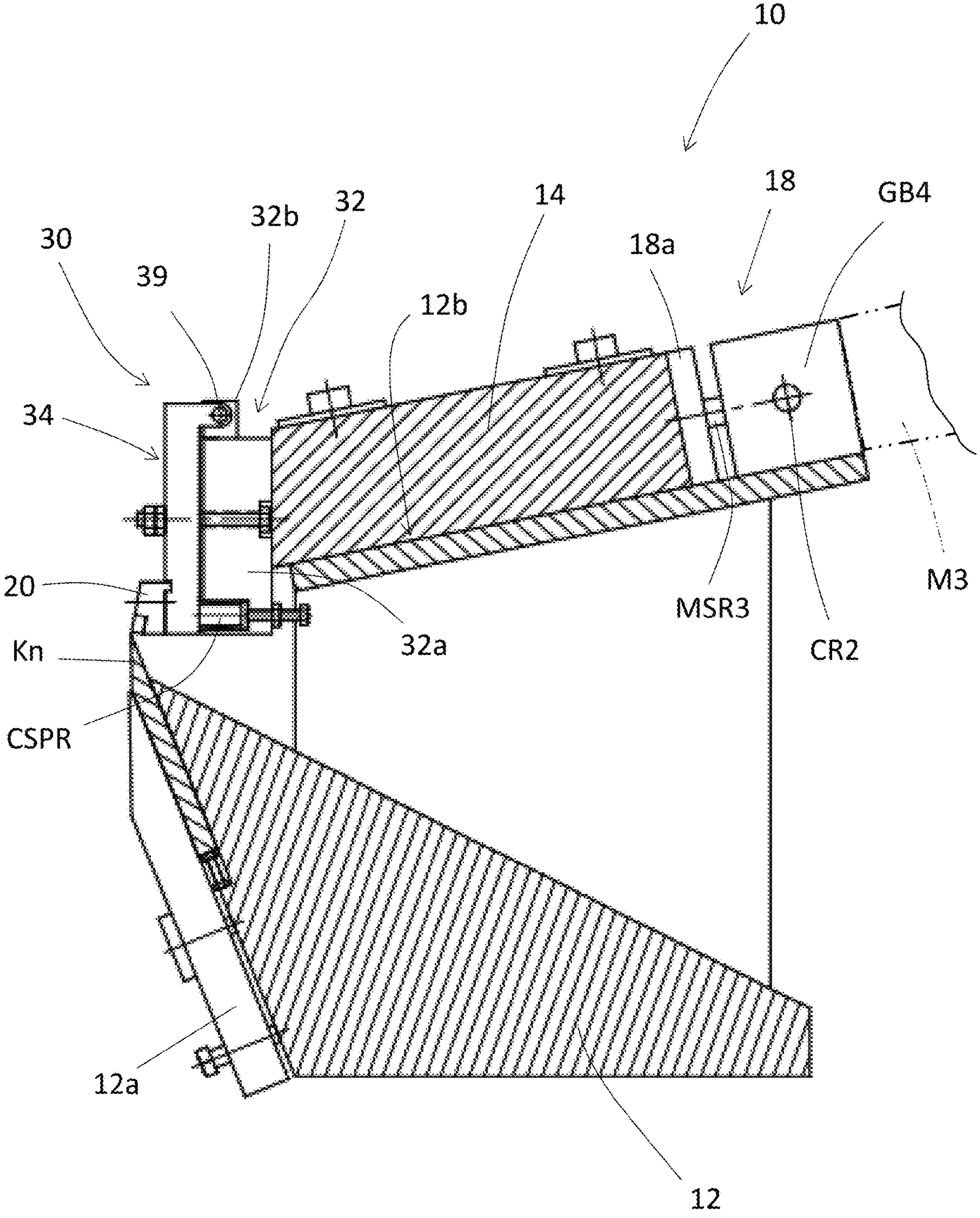
FIG. 4 is a sectional view illustrating the section along A-A in FIG. 3.

As shown in FIGS. 2 to 4, the knife mount 12 extends in the longitudinal direction of the knife Kn, and a knife clamp 12*a* is fastened to the knife mount 12 along the extending direction. The knife Kn is held between the knife mount 12 and the knife clamp 12*a*.

The nosebar mount 14 is disposed on an inclined surface 12*b* on the upper part of the knife mount 12 as shown in FIG. 4 and extends in the longitudinal direction of the nosebar 20, as shown in FIGS. 2 and 3. The nosebar mount 14 is configured so that the nosebar 20 (more specifically, a later-described tip TP attached to the nosebar 20) is movable by a moving device 18 in a direction approaching and moving away from the knife Kn. As shown in FIGS. 2 and 4, the moving device 18 includes a pair of internally threaded bodies 18*a*, 18*a* attached to the nosebar mount 14 (see FIG. 4), a pair of externally threaded rods MSR3 and MSR3 engaged to the pair of internally threaded bodies 18*a*, 18*a* (see FIG. 4), a pair of gearboxes GB3 and GB4 connected to the externally threaded rods MSR3 and MSR3 (see FIG. 2), a motor M3 having a rotating shaft (not shown) connected to the gearboxes GB3 (see FIGS. 2 and 4), and a connecting shaft CR2 for connecting the pair of gearboxes GB3 and GB4 (see FIG. 2). The nosebar mount 14 corresponds to the "pressure bar mount" of the present invention, and the nosebar 20 is an example of an embodiment corresponding to the "pressure bar" of the present invention.

Figure 5:
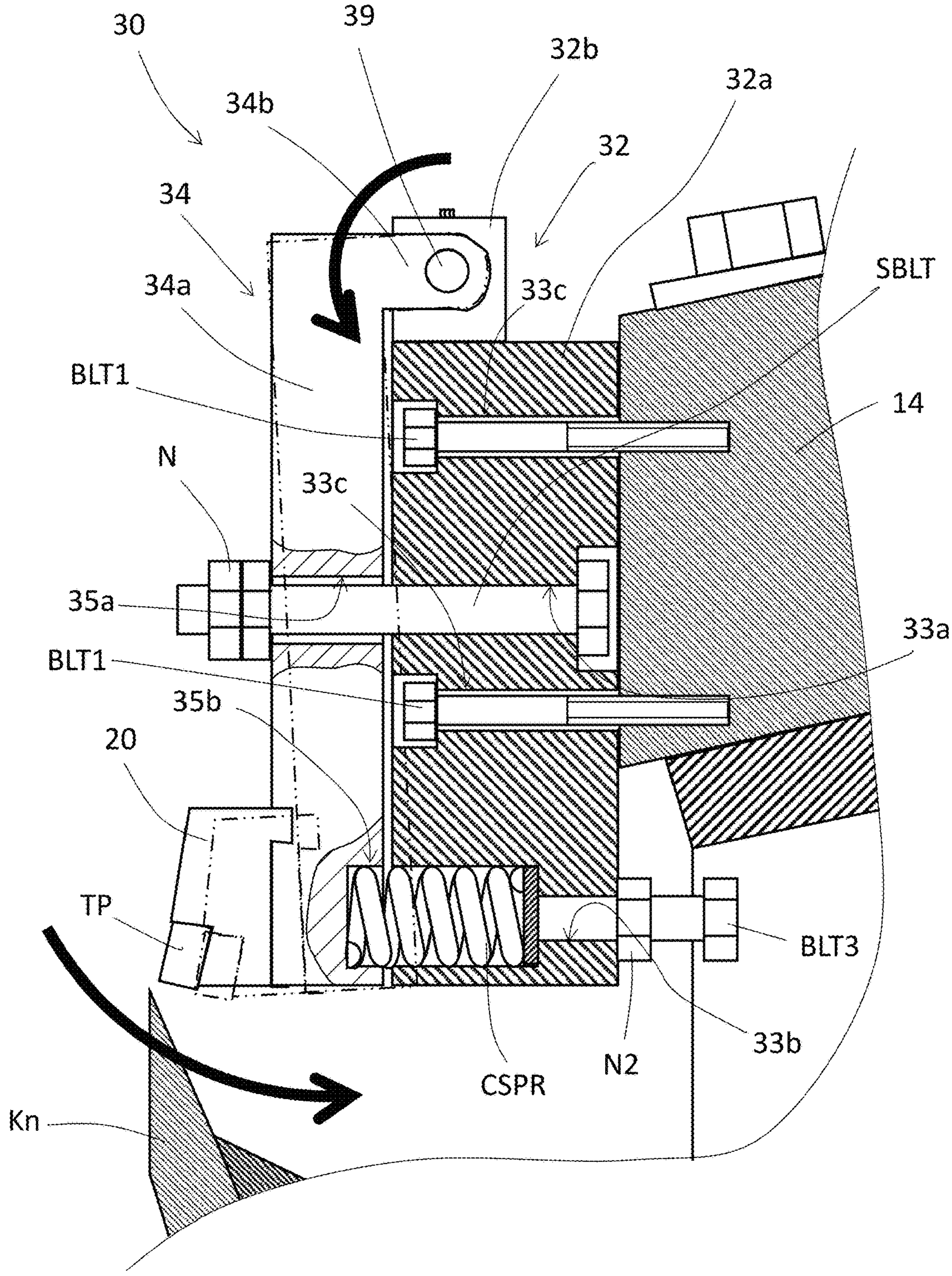
FIG. 5 is an explanatory view illustrating details of an assembled state of a support 34 to a fixture 32.

As shown in FIGS. 4 and 5, the support member 30 includes a plurality of fixtures 32 to be fixed to the nosebar mount 14, and a plurality of supports 34 configured to support the nosebar 20 and to be swingably supported by the plurality of fixtures 32, the supports 34 being arranged between the nosebar 20 and the nosebar mount 14. As shown in FIGS. 2 and 3, the support member 30 includes a plurality of support members 30 arranged at predetermined intervals in the extending direction of the nosebar mount 14. In the present embodiment, thirteen support members 30 are arranged.

Figure 6:
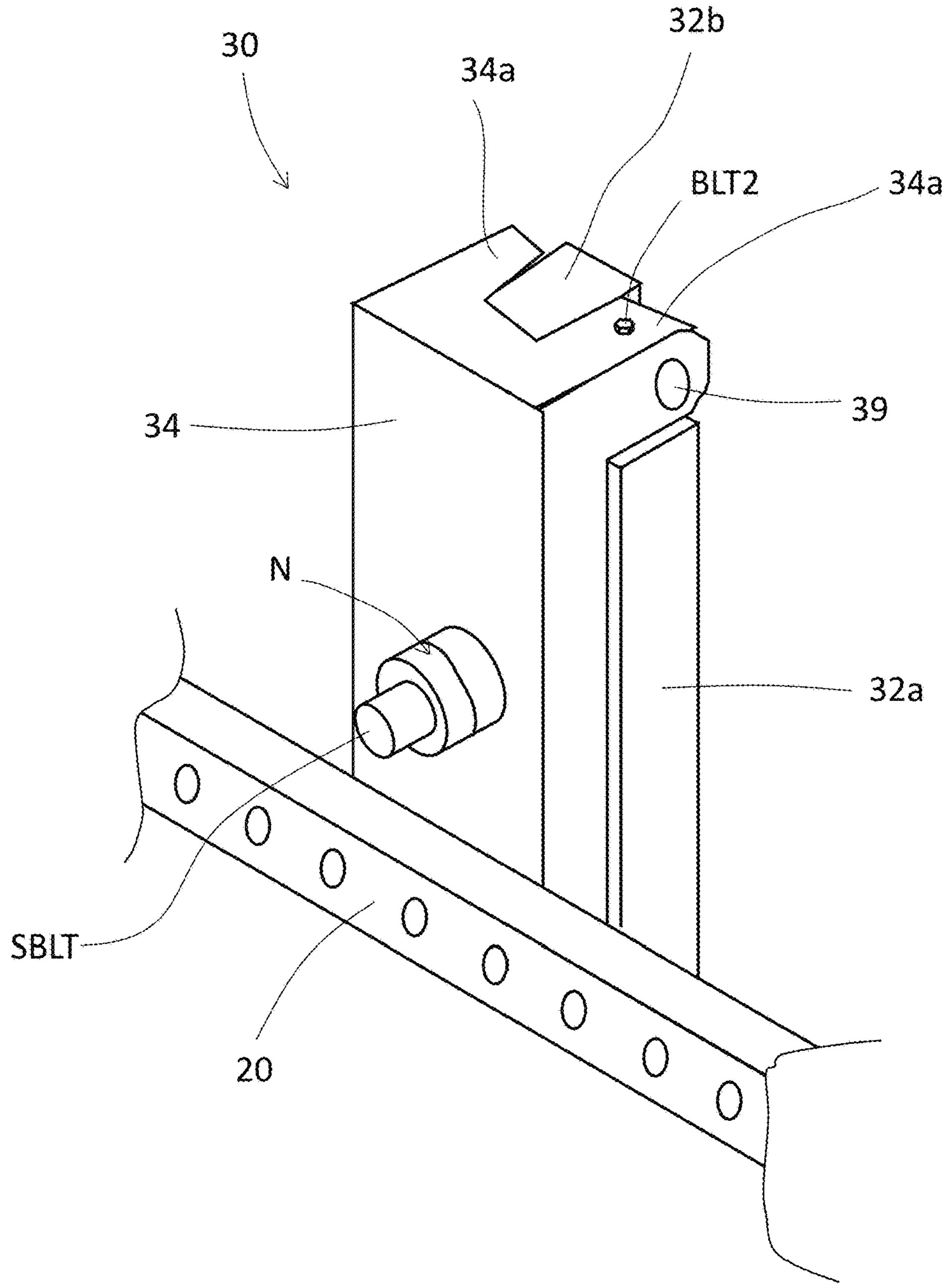
FIG. 6 is an external view illustrating an external appearance of the support 34 assembled to the fixture 32.
Figure 7:
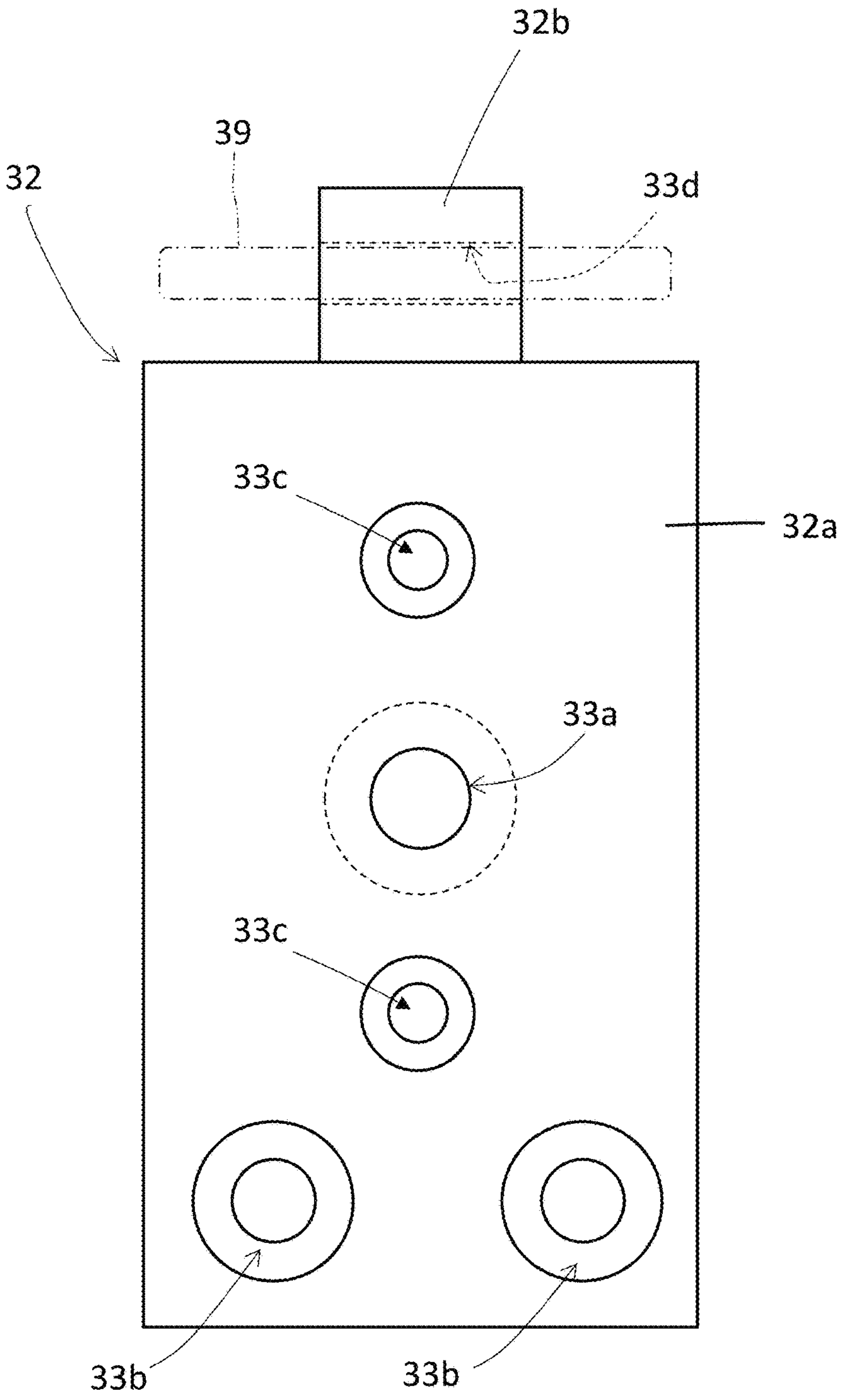
FIG. 7 is a front view of the fixture 32 as viewed from the support 34 side.

As shown in FIGS. 5 to 7, each fixture 32 includes a main body 32*a* and a protrusion 32*b* integrated with the main body 32*a*. The main body 32*a* has a rectangular shape in the vertical direction when viewed from one side (the left side in FIG. 5) in a direction orthogonal to both the arrangement direction (the extending direction of the nosebar mount 14, and the horizontal direction in FIG. 9) and the vertical direction (the up-down direction in FIG. 9) of the support members 30. As shown in FIG. 7, the main body 32*a* has a stepped hole 33*a* disposed substantially at the center, a pair of stepped holes 33*b*, 33*b* disposed at the lower end (the lower end in FIG. 7) of the main body 32*a*, and stepped holes 33*c*, 33*c* arranged on both sides in the vertical direction with respect to the stepped hole 33*a*. The stepped hole 33*a* has a large diameter on the surface side (the right side in FIG. 5) that comes in contact with the nosebar mounting base 14, and has a small diameter on the side where the support 34 is disposed (the left side in FIG. 5). As shown in FIG. 5, the small-diameter portion has an inner diameter substantially equal to the shaft diameter of a stopper bolt SBLT, so that the head portion of the stopper bolt SBLT is accommodated in the large-diameter portion.

The stepped holes 33*b*, 33*b* have a large diameter on the side where the support 34 is arranged (the left side in FIG. 5). As shown in FIG. 5, compression coil springs CSPR are accommodated in the large-diameter portions of the stepped holes 33*b*, 33*b*. The stepped holes 33*b*, 33*b* have the same inner diameter as the outer diameter of the compression coil springs CSPR. The small-diameter portions of the stepped holes 33*b* have internal threads. A bolt BLT3 is engaged with the internal thread.

The compression coil spring CSPR has a length protruding from the main body 32*a*. Here, the compression coil spring CSPR has a spring constant set to a value at which the compression coil spring CSPR can press the peeled portion 90 of the log PW with an appropriate pressing force when the single plate Ven is peeled from the log PW by the knife Kn (see FIG. 10) and also the nosebar 20 moves in a direction away from the log PW when the knife Kn peels a knot part of the log PW or when a fragment or chip of the log PW enters the cutting edge, so that excessive pressing against the peeled portion 90 by the nosebar 20 can be suppressed. The nosebar 20 has a bending rigidity in the direction in which the peeled portion 90 of the log PW is pressed and the direction away from the peeled portion 90, and the bending rigidity is smaller than a spring constant of the compression coil spring CSPR. The compression coil spring CSPR is an example of an embodiment corresponding to the "first urging member," "second urging member," and "ninth urging member" of the present invention, and the spring constant of the compression coil spring CSPR is an example of an embodiment corresponding to the "movement rigidity" of the present invention.

The stepped holes 33*c*, 33*c* have a small diameter on the surface side (the right side in FIG. 5) that comes in contact with the nosebar mount 14, and have a large diameter on the side where the corresponding support 34 is disposed (the left side in FIG. 5). As shown in FIG. 5, the fixtures 32 are fixed to the nosebar mount 14 by bolts BLT1, BLT1 that are inserted from the large-diameter sides of the stepped holes 33*c* and 33*c*, respectively.

The protrusion 32*b* is disposed substantially at the center of the main body 32*a* in the short direction (the lateral direction, and the left-right direction in FIG. 9), and protrudes from the upper end surface of the main body 32*a*. As shown in FIG. 7, the protrusion 32*b* has a through-hole 33*d* penetrating in the lateral direction (the left-right direction in FIG. 7). The through-hole 33*d* has an inner diameter slightly larger than the diameter of a fulcrum shaft 39 described later (i.e., an inner diameter that allows a clearance fit). The through-hole 33*d* accommodates the fulcrum shaft 39 therein.

As shown in FIGS. 5 and 6, each support 34 includes a main body 34*a*, and a pair of holding parts 34*b*, 34*b* orthogonally integrated with the main body 34*a*. The main body 34*a* has, when viewed from one side in a direction orthogonal to both the arrangement direction of the support members 30 (the extending direction of the nosebar mount 14, the horizontal direction in FIG. 9) and the vertical direction (the up-down direction in FIG. 9), a rectangular shape that is long in the vertical direction. The support 34 is an example of an embodiment corresponding to the "first support," "second support," and "third support" of the present invention.

Figure 8:
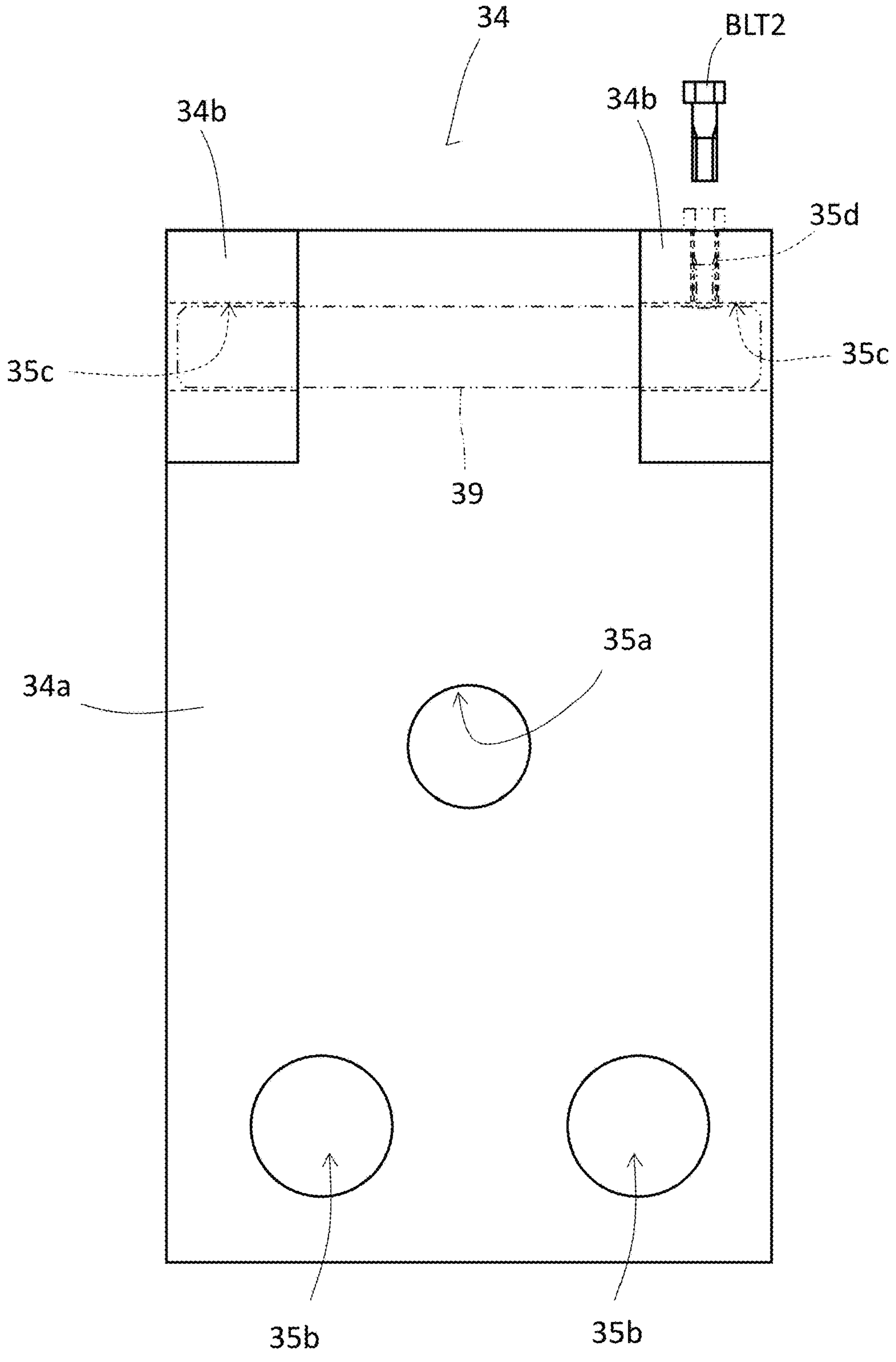
FIG. 8 is a rear view of the support 34 as viewed from the fixture 32 side.

As shown in FIG. 8, the main body 34*a* has a through-hole 35*a* substantially centrally and has a pair of recesses 35*b*, 35*b* at the lower end (the lower end in FIG. 8). As shown in FIG. 5, the through-hole 35*a* has an inner diameter larger than the shaft diameter of the stopper bolt SBLT. The portion of the main body 34*a* other than the lower end corresponds to the "first connecting portion," "second connecting portion," and "third connecting portion" of the present invention, and the lower end of the main body 34*a* is an example of an embodiment corresponding to the "third end," "fourth end," and "tenth end" of the present invention.

The recesses 35*b*, 35*b* are open on the side where the fixtures 32 are arranged (the left side in FIG. 5), and are closed as a dead end on the side (the right side in FIG. 5) opposite to the side where the fixtures 32 are arranged (the left side in FIG. 5). The recesses 35*b*, 35*b* have substantially the same inner diameter as the outer diameter of the compression coil springs CSPR, so that, as shown in FIG. 5, the recesses 35*b*, 35*b* accommodate the distal ends of the compression coil springs CSPR (the protruding portions from the stepped holes 33*b*, 33*b* of the fixture 32) respectively. Note that the nosebar 20 is attached to the main body 34*a* on the dead-end side of the recesses 35*b*, 35*b*.

As shown in FIG. 8, the pair of holding parts 34*b*, 34*b* is disposed on one end in the longitudinal direction (the vertical direction in FIG. 8) of the main body 34*a* (the upper end in the vertical direction when assembled to the nosebar mount 14) and has a through-holes 35*c*, 35*c* penetrating in the short direction (the lateral direction and the left-right direction in FIG. 8). The through-hole 35*c*, 35*c* has an inner diameter slightly larger than the outer diameter of the fulcrum shaft 39 (i.e., an inner diameter that allows a clearance fit). Further, one of the pair of holding parts 34*b*, 34*b* has a screw hole 35*d* penetrating to the through-hole 35*c*. The screw hole 35*d* engages with a bolt BLT2. Note that the dimension between the pair of holding parts 34*b*, 34*b* is set to a value slightly larger than the dimension of the protrusion 32*b* of the fixture 32 in the lateral direction (the left-right direction in FIG. 9). The portion of the main body 34*a* having the holding parts 34*b*, 34*b* is an example of an embodiment corresponding to the "first end," "second end," and "ninth end" of the present invention.

The support members 30 are formed by assembling the supports 34 thus configured to the fixtures 32 in a swingable manner. First, each support 34 is assembled to each fixtures 32 so that the pair of holding parts 34*b*, 34*b* sandwich the protrusion 32*b* of the fixture 32 (see FIG. 9). The fulcrum shaft 39 is then inserted from one side of the through-holes 35*c*, 35*c* to the other side of the through-holes 35*c*, 35*c* of the holding parts 34*b*, 34*b* through the through-hole 33*d* of the protrusion 32*b*. The fulcrum shaft 39 is an example of an embodiment corresponding to the "first fulcrum shaft," "second fulcrum shaft," and "third fulcrum shaft" of the present invention.

Next, the threaded bolt BLT2 is screwed into the screw hole 35*d* (see FIG. 8) and is fixed thereto so that the fulcrum shaft 39 does not rotate. Thus, in the present embodiment, the rotation of the fulcrum shaft 39 is prevented by screwing the bolt BLT2 until it comes into contact with the fulcrum shaft 39. For preventing the rotation of the fulcrum shaft 39, a configuration may be adopted in which the fulcrum shaft 39 and the through-hole 33*d* or the fulcrum shaft 39 and the through-holes 35*c*, 35*c* (or only one of them) are fitted in a tight fit.

Subsequently, the compression coil springs CSPR are accommodated in the large-diameter portions of the pair of stepped holes 33*b*, 33*b*, the stopper bolt SBLT is inserted from the large-diameter portion side of the stepped hole 33*a* of each fixture 32, and the distal end of the SBLT is made to protrude from the through-hole 35*a* of the main body 34*a* of the support 34. Finally, a nut N is engaged with the distal end of the stopper bolt SBLT (see FIG. 5) to prevent the dropout from the fixture 32 of the support 34, which completes the assembling. When the supports 34 are assembled to the fixtures 32, the distal ends of the compression coil springs CSPR are accommodated in the recesses 35*b*, 35*b* of the supports 34.

Here, by adjusting the degree of engagement (screw amount) of the nut N, the positional relationship between the tip TP and the knife Kn attached to the nosebar 20 is adjusted. Specifically, the tip TP and the knife Kn are adjusted to be parallel to each other with a desired distance. Further, by adjusting the degree of engagement (screw amount) of the bolt BLT3, the spring force (restoring force) of the compression coil spring CSPR is adjusted to a desired value. After adjusting the spring force (restoring force) of the compression coil spring CSPR to a desired value, a nut N2 is tightened to restrict the axial movement of the bolt BLT3 with respect to the fixtures 32 (the axial position of the bolt BLT3 is fixed).

Figure 9:
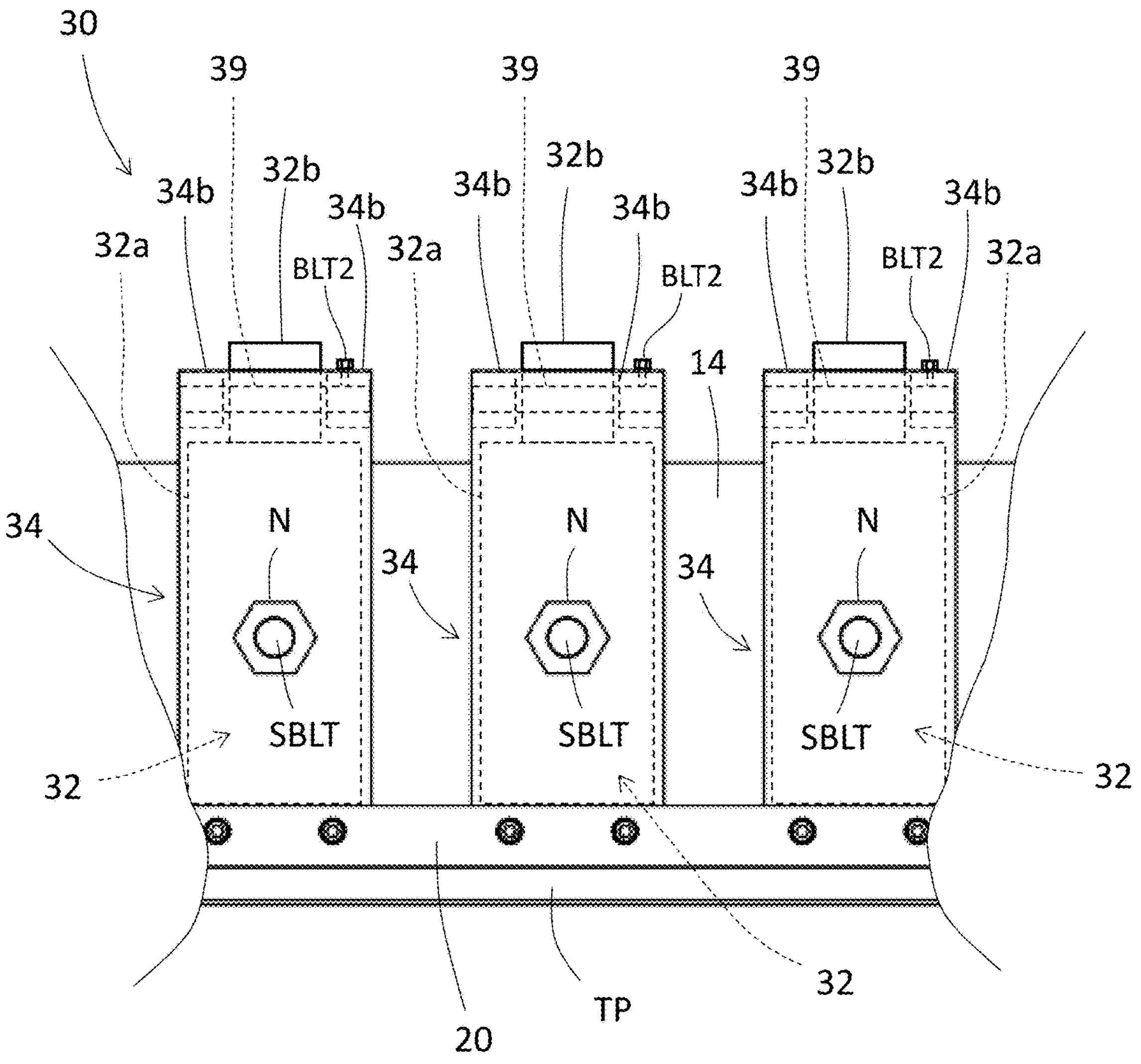
FIG. 9 is an explanatory view illustrating a state in which a nosebar 20 is supported by a support member 30.

As described above, each support 34 is fixed to the corresponding fixture 32 in a state where the support 34 is urged by the compression coil spring CSPR in a direction away from the fixture 32 with a desired spring force (restoring force) and is swingable about the fulcrum shaft 39. Note that, after the plurality of support members 30 are attached to the nosebar mount 14, the long nosebar 20 is attached to the lower end of the supports 34 (the face of the main body 34*a* on the dead-end side of the recesses 35*b*, 35*b*, the lower end in FIG. 6). The nosebar 20 has a length extending between the support members 30 arranged at both ends in the arrangement direction of the support members 30 (the extending direction of the nosebar mount 14, the horizontal direction in FIGS. 2 and 3). A tip TP is attached to a lower portion of the nosebar 20, as shown in FIGS. 5 and 9. The nosebar 20 thus attached to the support 34 is urged in a direction away from the fixture 32 with a desired spring force (restoring force) by the compression coil springs CSPR via the support 34.

Next, a description is given to how the peeled portion 90 of the log PW is pressed by the nosebar 20 during the operation of the rotary veneer lathe 1 including the knife carriage 10 configured as described above. When the operation of the rotary veneer lathe 1 is started, the log PW held between the cutting spindles 2*a* and 2*b* is rotated, and the knife carriage 10 is moved (stepped forward) in a direction approaching the log PW. The knife Kn is then pressed against the rotating log PW, and the veneer Ven of a desired thickness is peeled out (see FIG. 10).

At this time, as shown in FIG. 10, the nosebar 20 presses the peeled portion 90 from the side opposite to the side where the knife Kn is arranged. Thus, the occurrence of cracks in the peeled portion 90 is suppressed, and the occurrence of uneven thickness and rough skin of the veneer Ven is prevented. The pressing force of the nosebar 20 against the peeled portion 90 is given by the spring force (restoring force) of the compression coil springs CSPR.

Figure 11:
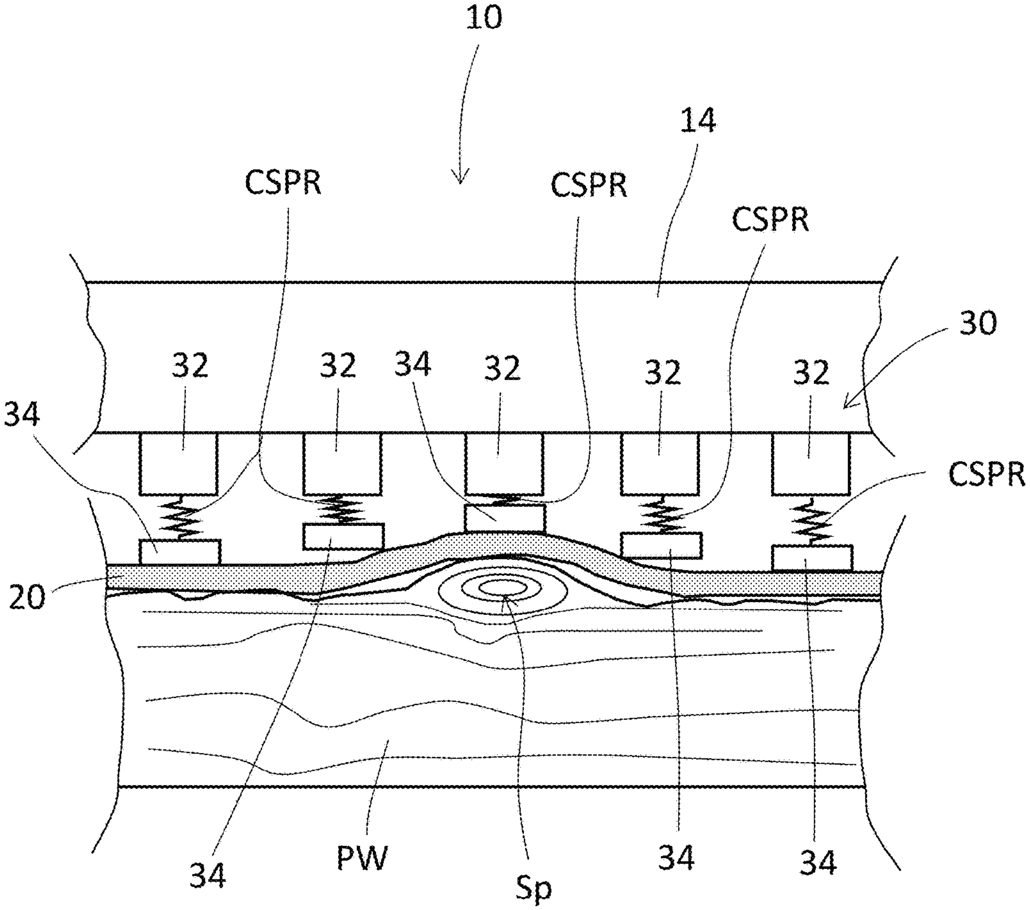
FIG. 11 is an explanatory diagram illustrating a state in which the nosebar 20 is bent and deformed by a knot part Sp of the log PW.

Here, when a knot part Sp of the log PW comes into contact with the nosebar 20 as shown in FIG. 11 while the veneer Ven is being peeled from the log PW by the knife Kn, the reaction force of the pressing force, which acts on the support 34 via the nosebar 20, increases, and the supports 34 swing in a direction away from the log PW around the fulcrum shaft 39 against the spring force (restoring force) of the compression coil springs CSPR (see the two-dot chain line in FIG. 10). At this time, the nosebar 20 also undergoes bending deformation in which the contact portion with the knot part Sp is maximized (see FIG. 11). Thus, excessive pressing of the nosebar 20 against the peeled portion 90 is suppressed. Meanwhile, an appropriate pressing force against the peeled portion 90 by the nosebar 20 is reliably secured.

Besides, the nosebar 20 extends as one body between the support members 30 arranged at both ends in the arrangement direction of the support members 30 (the extending direction of the nosebar mount 14, the left-right direction in FIGS. 2 and 3). Thus, no scratch is caused on the veneer Ven by contact between the peeled portion 90 of the log PW with a corner of the nosebar 20, more specifically, a portion where three ridgelines of the tip TP attached to the nosebar 20 intersect with each other. Further, even in the case where the veneer Ven is peeled from the log PW containing water, no water seeping from the peeled portion 90 flows out to the veneer Ven due to the pressing against the peeled portion 90 by the nosebar 20. Therefore, no linear stain is made to the peeled veneer Ven.

Naturally, once the knot part Sp stops contacting the nosebar 20, the spring force (restoring force) of the compression coil springs CSPR causes the supports 34 to swing toward the log PW around the fulcrum shaft 39 and return to the original position (posture) (the solid line in FIG. 10), and thereby an appropriate pressing force on the peeled portion 90 by the nosebar 20 is secured.

According to the rotary veneer lathe 1 according to the embodiment of the present invention described above, the nosebar 20 is supported by the plurality of supports 34 arranged along the longitudinal direction of the nosebar 20, and the supports 34 are assembled to the fixtures 32 so that the supports 34 are able to swing independently of each other in a direction away from the log PW according to the magnitude of the reaction force of the pressing force acting on the supports 34 through the nosebar 20. Therefore, the nosebar 20 can be partially bent and deformed through the movement of each support 34. That is, when the knife Kn peels the knot part Sp of the log PW or when a fragment or chip of the log PW enters the cutting edge, the nosebar 20 is not uniformly deformed, but the portion of the nosebar 20 pressing where the knot part Sp is present or the portion of the nosebar 20 corresponding to the location where the fragment or chip of the log PW enters the cutting edge can be greatly deformed, while the deformation amount (the amount of movement) of the nosebar 20 in the other portions can be kept small. Thus, it is possible to achieve both the securing of the appropriate pressing force against the peeled portion 90 by the nosebar 20 and the suppression of excessive pressing against the peeled portion 90 by the nosebar 20. Naturally, there is no such problem that the peeling of the veneer Ven is stopped due to the accumulation of the powdery wood chips at the cutting edge.

Further, according to the rotary veneer lathe 1 according to the embodiment of the present invention, the long nosebar 20 is configured to be partially deformed, and not to be configured with small divided pieces such that the pieces are deformed independently of each other as in the related art. Therefore, the corner of the nosebar 20, more specifically, the portion where the three ridges of the tip TP attached to the nosebar 20 intersect, does not come into contact with the peeled portion 90 of the log PW, causing no scratch onto the veneer Ven. Further, even when the veneer Ven is peeled from the log PW containing water, the water seeping from the peeled portion 90 due to the pressing against the peeled portion 90 by the nosebar 20 does not flow out to the veneer Ven. Thus, no linear stain is made to the veneer Ven. Since there are a plurality of support points in the nosebar 20, the nosebar 20 can be bent and deformed in a plurality of orders. That is, partial deformation of the nosebar 20 can be caused more finely.

Furthermore, according to the rotary veneer lathe 1 according to the embodiment of the present invention, the fulcrum shaft 39 is disposed vertically above the supports 34, and the spring force (restoring force) from the compression coil springs CSPR acts on the supports 34 from below in the vertical direction. Thus, the swinging of the support can be realized with a simple configuration, and even if the supports 34 move in the direction in which the nosebar 20 moves away from the log PW, the supports 34 (nosebar 20) can be returned to the original position (posture) by the spring force (restoring force) of the coil springs CSPR. In the embodiment of the present invention, the bending rigidity of the nosebar 20 in the direction in which the peeled portion 90 of the log PW is pressed and the direction away from the peeled portion 90 is smaller than the spring constant of the compression coil springs CSPR. Accordingly, the nosebar 20 can be effectively deformed when the supports 34 swing away from the log PW.

In the present embodiment, the nosebar 20 has a length extending between the support members 30 arranged at both ends in the arrangement direction of the support members 30 (the extending direction of the nosebar mount 14, the left-right direction in FIGS. 2 and 3). However, the nosebar 20 may be divided into plural bar parts between the support members 30 arranged at both ends in the arrangement direction of the support members 30 (the extending direction of the nosebar mount 14, the left and right direction in FIGS. 2 and 3). In this case, for example, a configuration using a plurality of nosebars 120 of the modifications illustrated in FIGS. 12 to 14 and a configuration using a plurality of nosebars 220 of the modifications illustrated in FIGS. 15 and 16. The nosebars 120, 220 are examples of an embodiment corresponding to the "first pressure bar" and "second pressure bar" of the present invention.

Figure 12:
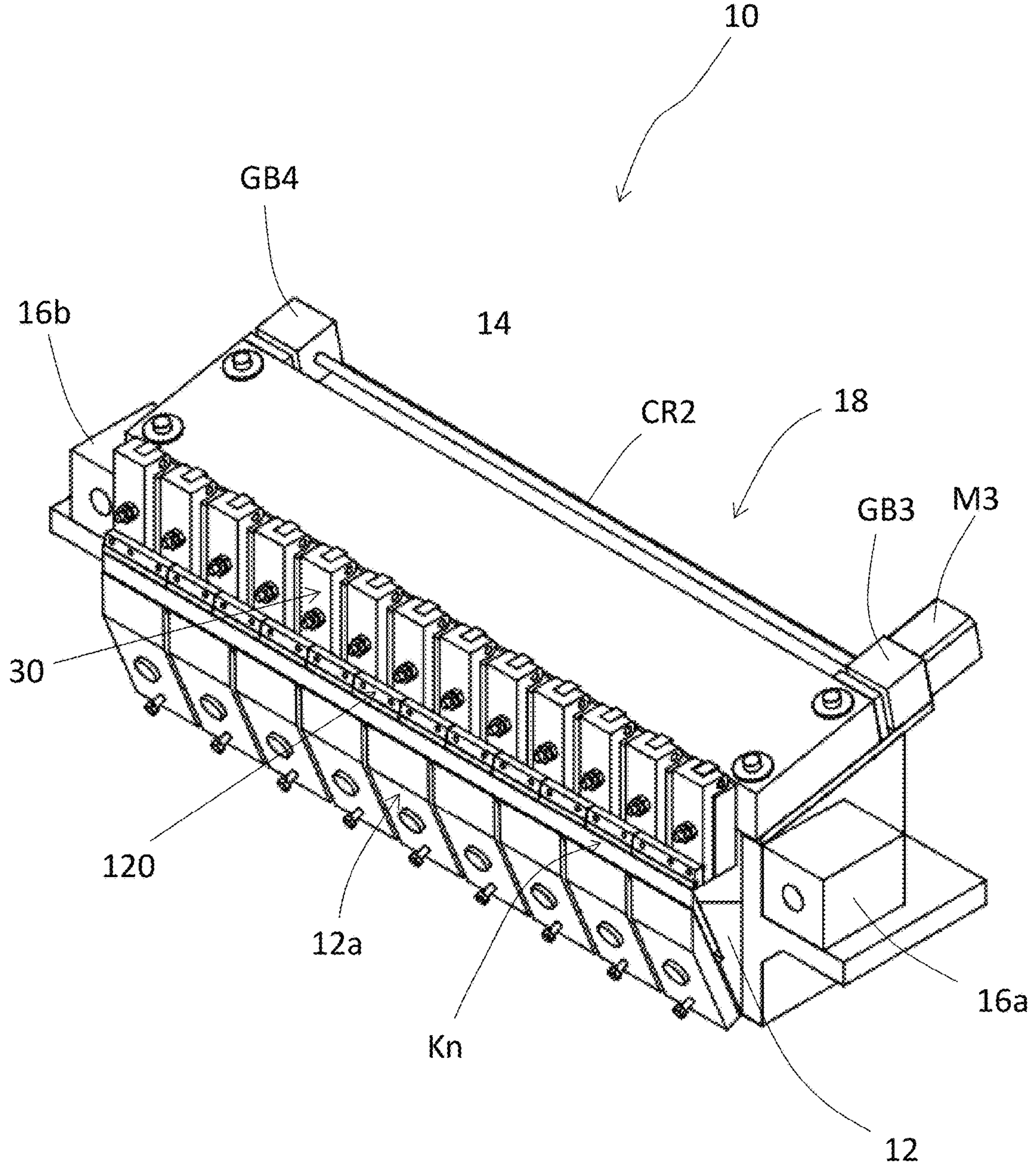
FIG. 12 is a perspective view illustrating the knife carriage 10 to which a nosebar 120 of a modification is attached.
Figure 13:
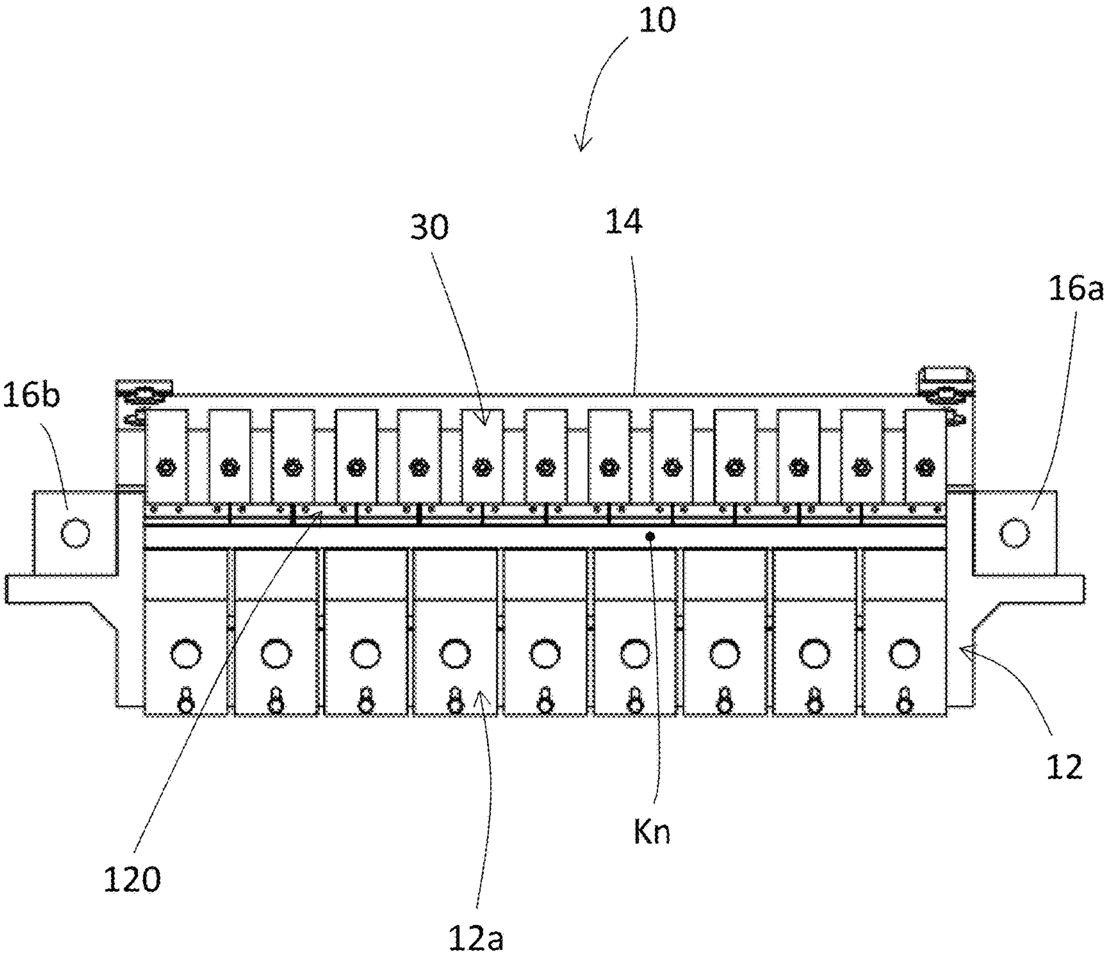
FIG. 13 is a front view of the knife carriage 10 to which the nosebar 120 of the modification is attached as viewed from the side where a log PW is placed.
Figure 14:
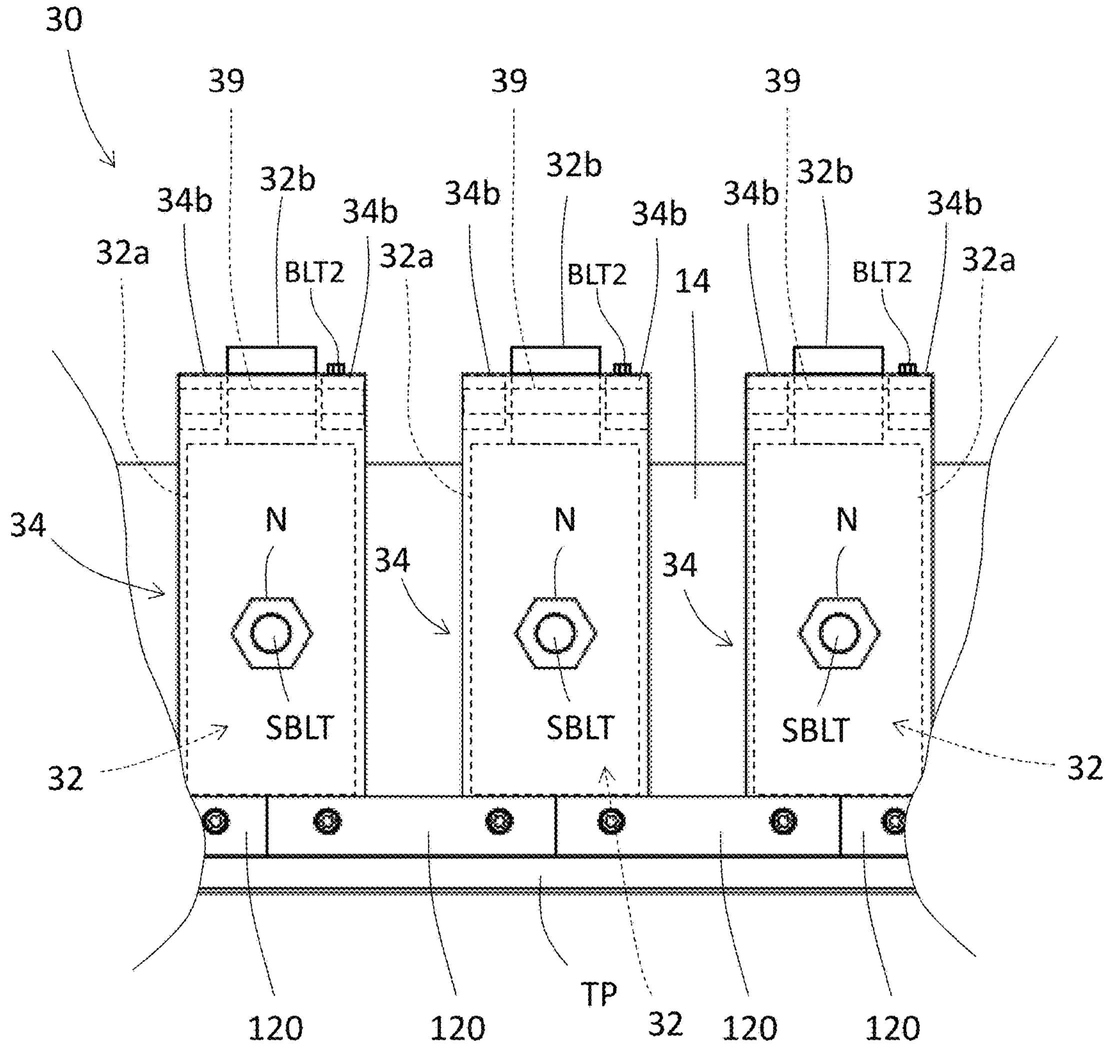
FIG. 14 is an explanatory view illustrating a state in which the nosebar 120 of a modification is supported by the support member 30.

As shown in FIGS. 12 to 14, nosebars 120 are supported by the support members 30 that are adjacent to each other at both ends in the longitudinal direction. More specifically, the nosebars 120 each have a length extending between the centers of the adjacent support members 30 in the lateral direction (the horizontal direction in FIG. 13). The nosebars 120 are supported by the support members 30 in a state where the end faces in the longitudinal direction of each of the nosebars 120 are in contact with each other.

Figure 15:
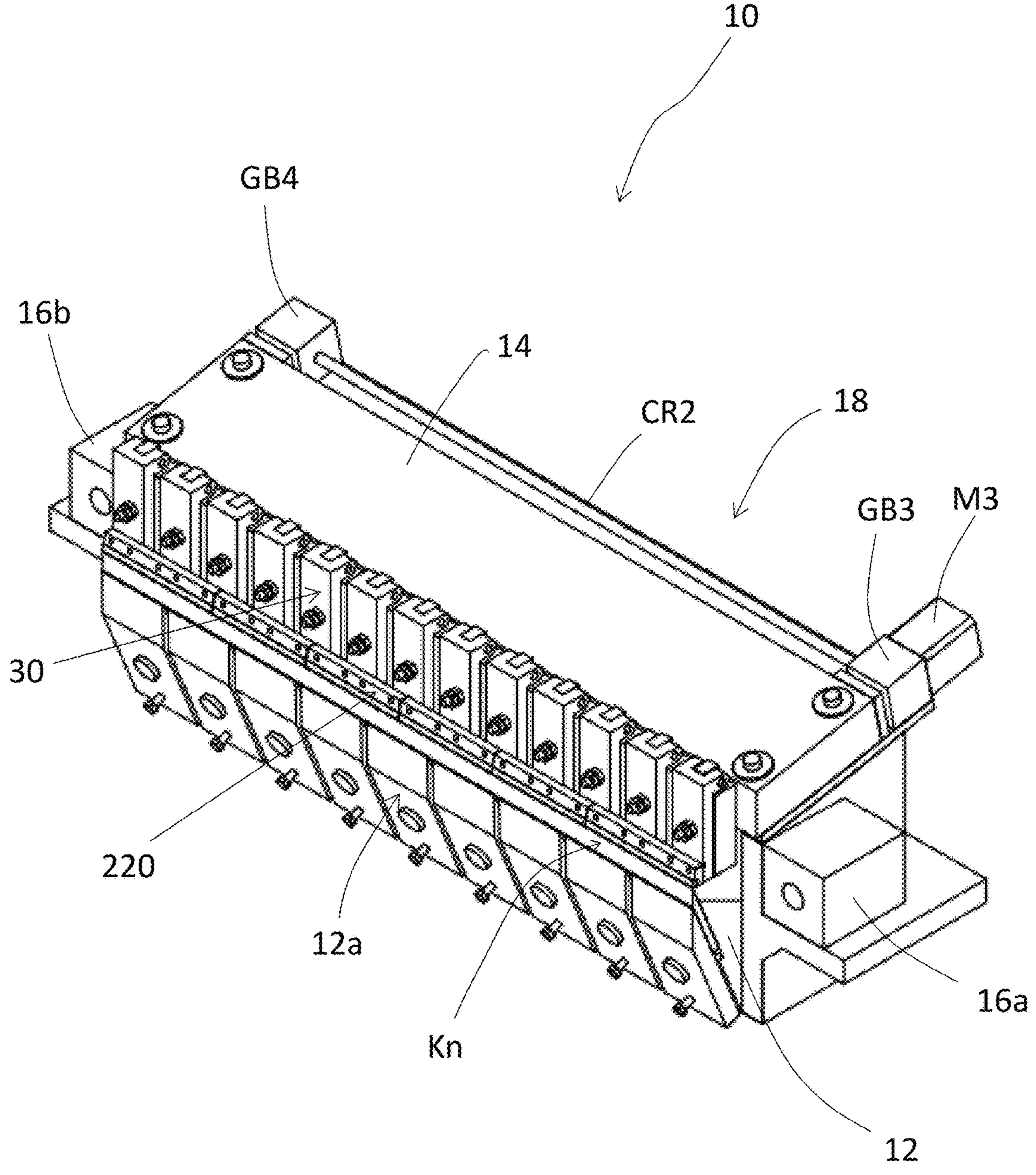
FIG. 15 is a perspective view illustrating the knife carriage 10 to which a nosebar 220 of a modification is attached.
Figure 16:
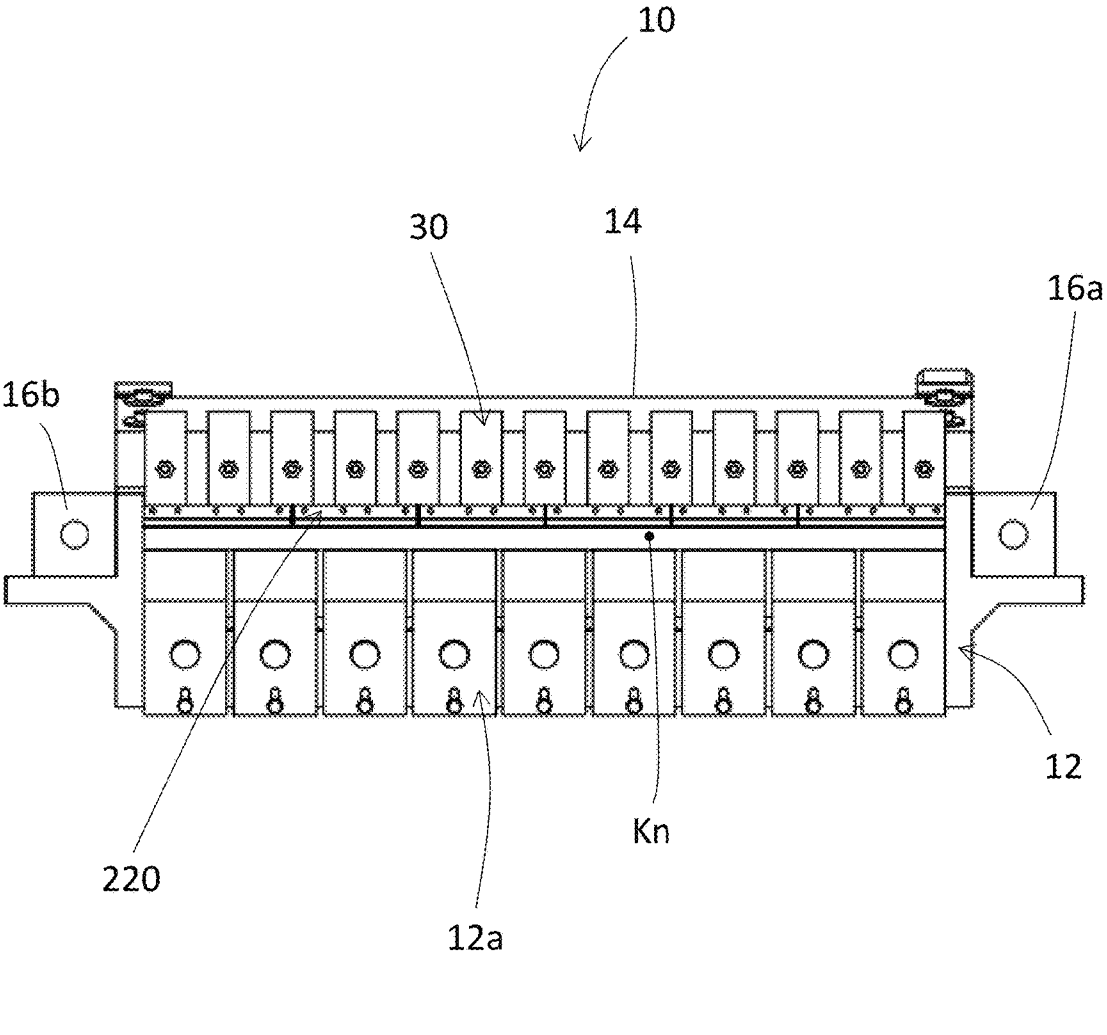
FIG. 16 is a front view of the knife carriage 10 to which the nosebar 220 of the modification is attached as viewed from the side where the log PW is placed.
Figure 17:
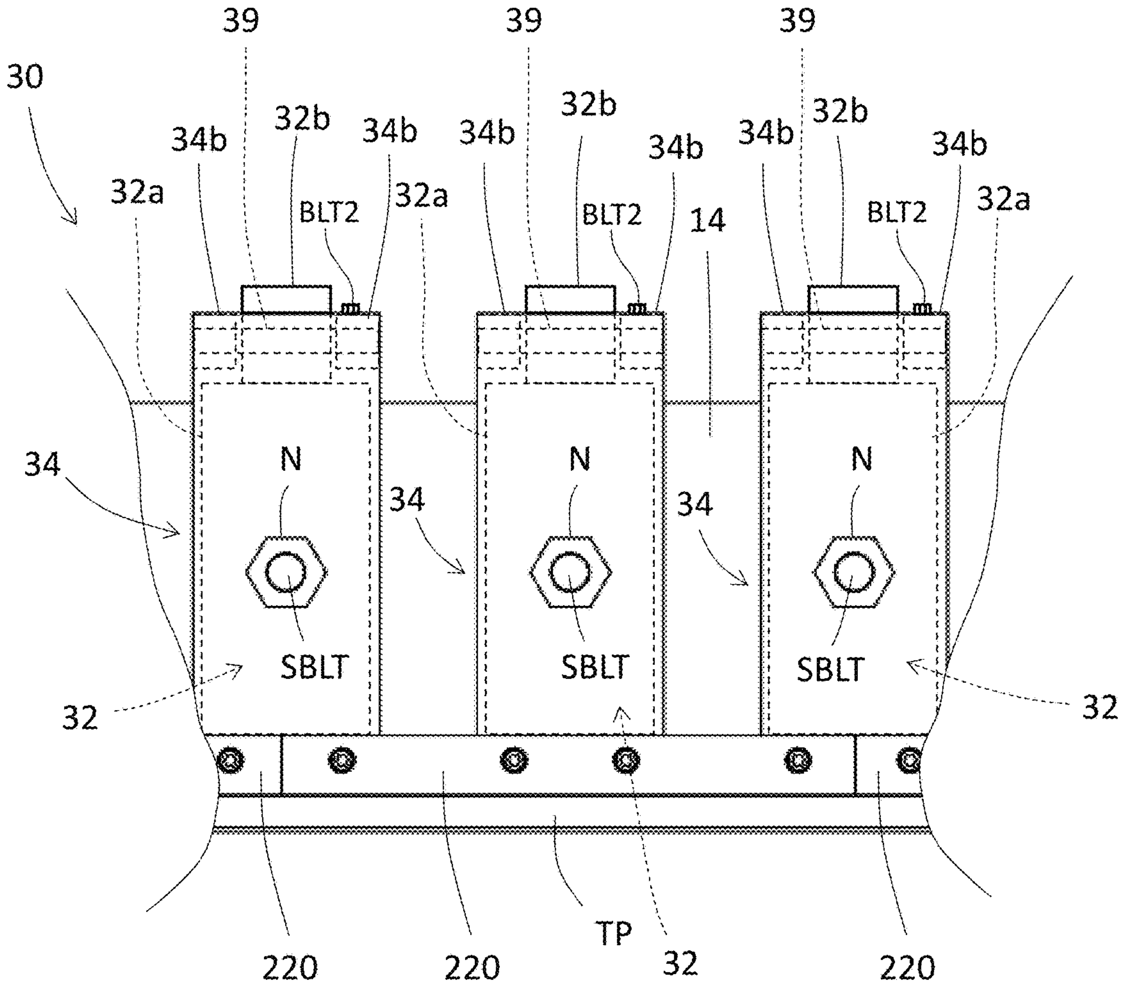
FIG. 17 is an explanatory view illustrating a state in which the nosebar 220 of a modification is supported by the support member 30.

As shown in FIGS. 15 to 16, the nosebars 220 each have a length extending over three adjacent support members 30. More specifically, the nosebars 220 each have a length extending between the centers in the lateral direction (the left-right direction in FIG. 13) of the support members 30 arranged at both ends of the three adjacent support members 30, and the nosebars 220 are supported by the three support members. In addition, the nosebars 220 are supported by the support members 30 in a state where the end faces in the longitudinal direction of each of the nosebars 220 are in contact with each other.

According to the rotary veneer lathe 1 using the nosebars 120, 220 of the modifications, when the knife Kn peels the knot part Sp of the log PW or when a fragment or chip of the log PW enters the cutting edge, the nosebars 120, 220 are not uniformly deformed, but the bar parts of the nosebars 120, 220 pressing where the knot part Sp is present or the portion of the nosebars 120, 220 corresponding to the location where the fragment or chip of the log PW enters the cutting edge can be greatly deformed, while the deformation amount (the amount of movement) of the nosebars 120, 220 in the other portions can be kept small. Thus, it is possible to more effectively achieve both the securing of the appropriate pressing force against the peeled portion 90 by the nosebars 120, 220 and the suppression of excessive pressing against the peeled portion 90 by the nosebars 120, 220.

Further, unlike the long nosebar 20 of the present embodiment, the nosebars 120, 220 of the modifications are composed of small divided bar parts in the longitudinal direction, but the nosebars 120, 220 are supported by the support members 30 in a state where the end faces in the longitudinal direction of each of the nosebars 120, 220 are in contact with each other. Thus, when the nosebars 120, 220 are bent and deformed with the swinging of the supports 34, the ends of the nosebars 120, 220 adjacent in the longitudinal direction are simultaneously deformed (moved), and thereby the occurrence of scratches onto the peeled veneer Ven is well prevented, where the scratches are caused when a corner of the ends of the nosebars 120, 220 adjacent in the longitudinal direction (specifically, the portion where three ridges of the tip TP attached to the nosebars 120, 220 intersect) comes into contact with the peeled portion 90. Further, when the nosebars 120, 220 are bent and deformed accompanied with the swinging of the supports 34, no gap is generated between the nosebars 120, 220. Thus, even when a veneer Ven is peeled from the log PW containing water, the water seeping from the peeled portion 90 due to the pressing against the peeled portion 90 by the nosebars 120, 220 does not flow out to the veneer Ven. Thus, no linear stain is made to the veneer Ven.

The nosebars 120, 220 of the modifications are supported by the support members 30 in a state where the end faces of the nosebars 120, 220 in the longitudinal direction are in contact with each other, but the end faces of the nosebars 120, 220 in the longitudinal direction may not be in contact with each other.

In the present embodiment, the compression coil springs CSPR are disposed at a position below the fulcrum shaft 39 in the vertical direction and on the backside face of the main body 34*a* of the support 34 where the nosebar 20 is attached, so that the restoring force of the compression coil springs CSPR urges the nosebar 20 in a direction away from the fixture 32 via the supports 34, but the present invention is not limited thereto. For example, as illustrated by support members 330 of the modification in FIG. 18, the tension coil springs PSPR may be located above the nosebar 20 in the vertical direction and also above the fulcrum shaft 39 in the vertical direction, so that the nosebar 20 is urged away from fixtures 332 via supports 334 by the restoring force of the tension coil springs PSPR.

Figure 18:
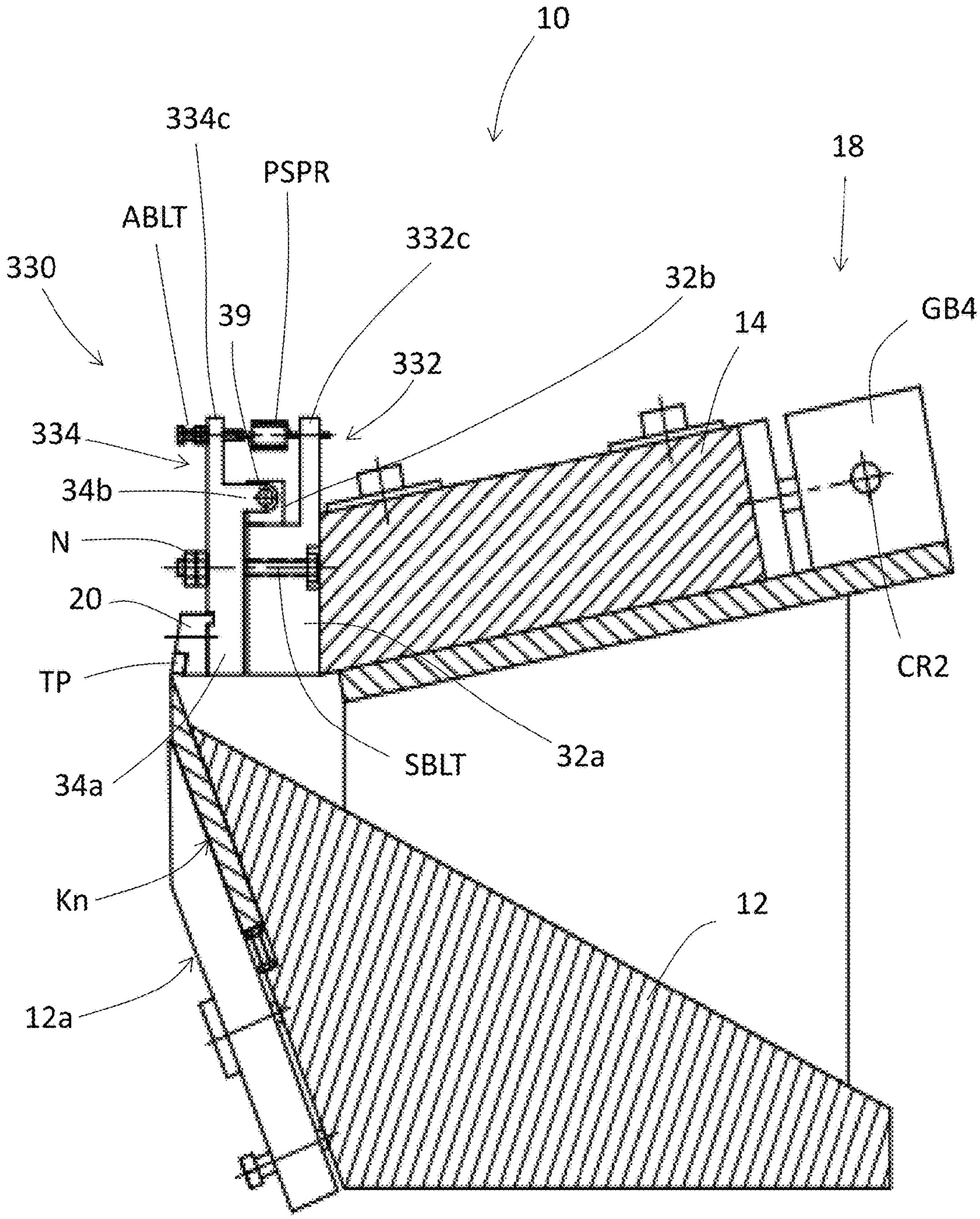
FIG. 18 is an explanatory view schematically illustrating a configuration of the knife carriage 10 including a support member 330 according to a modification.

Each fixture 332 of the modification has the same configuration as that of the fixtures 32 of the present embodiment described with reference to FIGS. 5 to 7 except that a spring supporting wall 332*c* is included as shown in FIG. 18. Therefore, the same reference numerals are given to the same elements of the fixture 332 of the modification as those of the fixture 32 of the present embodiment, and the detailed description thereof will be omitted.

As shown in FIG. 18, the spring supporting wall 332*c* is integrated with the main body 32*a* and extends in the same direction as the direction in which the protrusions 32*b* project from the upper end surface of the main body 32*a*. A hook (not shown) for hooking the extension coil spring PSPR is attached to an extension end of the spring supporting wall 332*c*.

As shown in FIG. 18, each support 334 of the modification has the same configuration as that of the support 34 of the embodiment shown in FIGS. 5, 6, and 8 except that the recesses 35*b* and 35*b* are not included, but a spring supporting wall 334*c* is included. Therefore, the same reference numerals are given to the same elements of the support 334 of the modification as those of the support 34 of the present embodiment, and the detailed description thereof is omitted. The support 334 is an example of an embodiment corresponding to the "first support," "second support," and "third support" of the present invention.

As shown in FIG. 18, the spring supporting wall 334*c* is integrated with the main body 34*a*, and extends along the longitudinal direction of the main body 34*a* and also a direction away from a pair of holding parts 34*b*, 34*b* integrated orthogonally to the main body 34*a*. An adjuster bolt ABLT for adjusting the spring force of the compression coil spring PSPR is attached to an extension end of the spring supporting wall 334*c*. The adjuster bolt ABLT is placed such that the axis is parallel to the extending direction of the pair of holding parts 34*b*, 34*b*. The spring supporting wall 334*c* is an example of an embodiment corresponding to the "first extending portion," "second extending portion," and "third extending portion" of the present invention, and the compression coil spring PSPR is an example of an embodiment corresponding to the "third urging member," "fourth urging member," and "tenth urging member" of the present invention.

As shown in FIG. 18, the fixtures 332 and the supports 334 of the modification configured as described above are assembled in a state where the tension coil springs PSPR are arranged between the spring supporting walls 332*c* and 334*c*. Then, the extension of the tension coil springs PSPR, that is the spring force, is adjusted by the adjuster bolt ABLT. The spring supporting walls 334*c* of the supports 334 are urged in a direction approaching the spring supporting wall 332*c* of the fixtures 332 by the spring force (restoring force) of the tension coil springs PSPR. Thus, the supports 334 are rotated clockwise about the fulcrum shafts 39. As a result, the nosebar 20 is urged away from the fixture 332 via the supports 334. The spring constant of the tension coil springs PSPR is determined to a value by taking into account the lever ratio, which is the ratio of the distance from the tip TP of the nosebar 20 to the fulcrum shaft 39 and the distance from the fulcrum shaft 39 to the adjuster bolt ABLT, so that the peeled portion 90 can be pressed with an appropriate pressing force and also, when the knife Kn peels a knot part of the log PW or when a fragment or chip of the log PW enters the cutting edge, the nosebar 20 moves in a direction away from the log PW and excessive pressing against the peeled portion 90 can be suppressed. Also, the bending rigidity of the nosebar 20 in the direction in which the peeled portion 90 of the log PW is pressed and in the direction away from the peeled portion 90 is smaller than the swing rigidity of the supports 334, the swing rigidity being determined by the lever ratio and the spring constant of the tension coil spring PSPR. Note that the swing rigidity of the supports 334 is defined as the difficulty of swinging the supports 334 in a direction in which the nosebar 20 moves away from the log PW. The swing rigidity of the supports 334 is an example of an embodiment corresponding to the "movement rigidity" of the present invention.

The knife carriage 10 using the support members 330 of the present modification provides the effects similar to those of the knife carriage 10 using the support members 30 of the present embodiment. As one of the effects, for example, when the knife Kn peels a knot part of the log PW or when a fragment or chip of the log PW enters the cutting edge, the pressure bar 20 does not deform uniformly, but the portion of the nosebar 20 pressing where the knot part Sp is present in the log PW or the portion of the nosebar 20 corresponding to the location where the fragment or chip of the log PW enters the cutting edge can be greatly deformed, while the deformation amount (the amount of movement) of the nosebar 20 in the other portions can be kept small: as a result, it is possible to achieve both the securing of the appropriate pressing force against the peeled portion 90 by the nosebar 20 and the suppression of excessive pressing against the peeled portion 90 by the nosebar 20. As another effect, the occurrence of scratches onto the peeled veneer Ven is well prevented, the scratches being caused when a corner of the nosebar 20 (specifically, the portion where three ridges of the tip TP attached to the nosebar 20 intersect) comes into contact with the peeled portion 90 of the log PW. Further, no gap is generated when the nosebar 20 is bent and deformed, and thereby, even when a veneer Ven is peeled from the log PW containing water, the water seeping from the peeled portion 90 due to the pressing against the peeled portion 90 by the nosebar 20 does not flow out to the veneer Ven.

According to the modification, since the tension coil springs PSPR are disposed vertically above the fulcrum shafts 39, maintenance such as replacement of the tension coil springs PSPR can be easily performed.

In the support members 30 and 330 of the present embodiment and the modification described above, the supports 34 are swingably supported by the fixtures 32 via the fulcrum shafts 39, but the present invention is not limited thereto. For example, as illustrated in a support member 430 of a modification shown in FIG. 19, the support 434 may be swingably supported by a fixture 432 via a roller R rotatably supported by the fixture 432.

Figure 19:
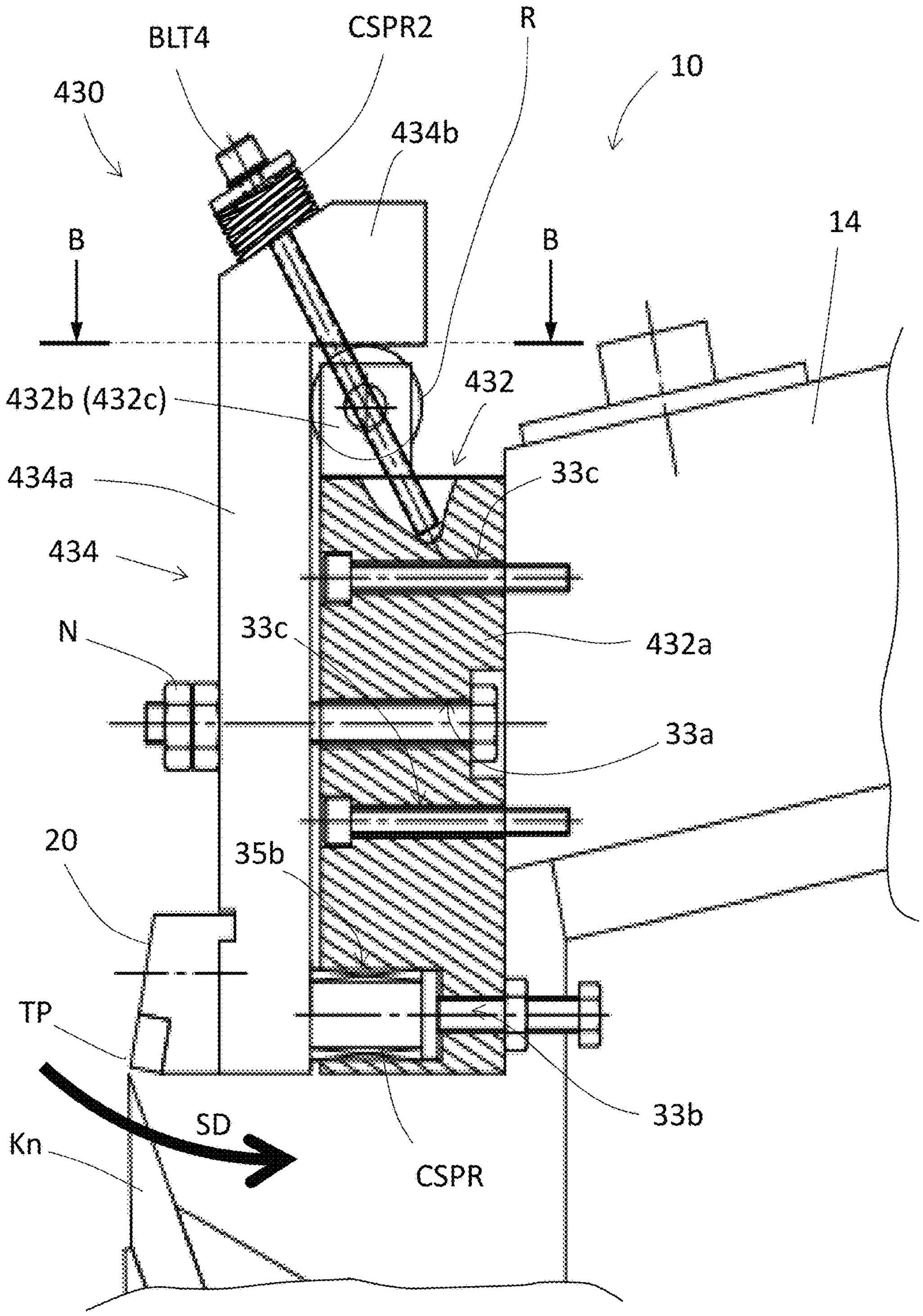
FIG. 19 is an explanatory view schematically illustrating a configuration of the knife carriage 10 including a support member 430 according to a modification.
Figure 20:
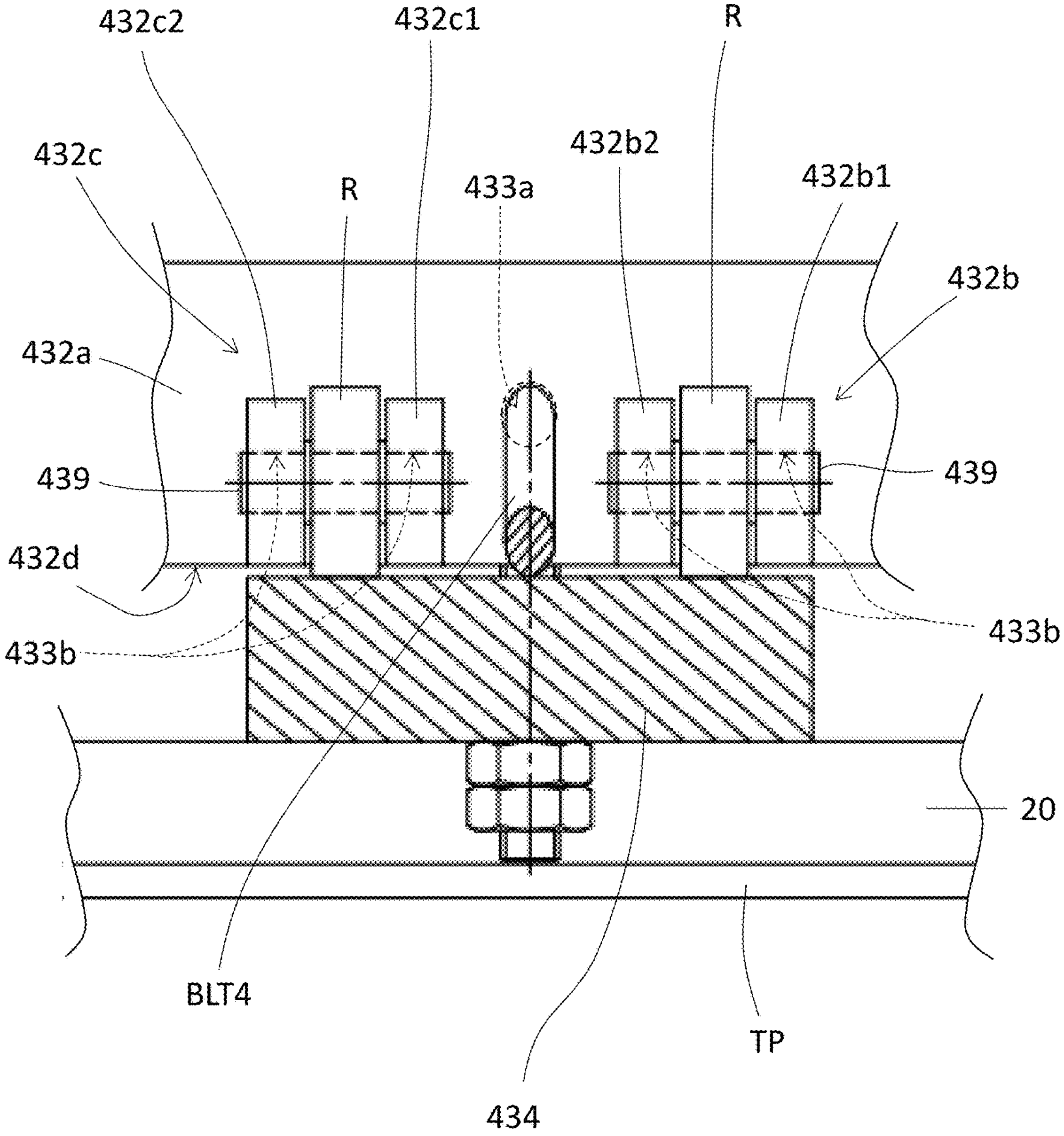
FIG. 20 is a cross-sectional view illustrating a cross-section along B-B in FIG. 19.

As shown in FIGS. 19 and 20, the fixture 432 includes a main body 432*a* and support walls 432*b* and 432*c* that are integrally formed with the main body 432*a* so as to protrude from the upper end surface of the main body 432*a*. The main body 432*a* extends along the direction in which the nosebar 20 extends (the left-right direction in FIG. 20). The main body 432*a* has a screw hole 433*a* formed between the support walls 432*b* and 432*c*. The main body 432*a* has a stepped hole 33*a*, a pair of stepped holes 33*b*, 33*b*, and stepped holes 33*c*, 33*c*, similarly to the main body 32*a* of the fixture 32 of each support member 30 of the present embodiment.

As shown in FIG. 20, the support walls 432*b* and 432*c* are arranged at predetermined intervals in the extending direction of the main body 432*a* (the left-right direction in FIG. 20). The support walls 432*b*, 432*c* are arranged in a plurality of sets in the extending direction of the main body 432*a* (the left-right direction in FIG. 20), with the support walls 432*b*, 432*c* arranged at a predetermined interval as one set (see FIGS. 23 and 24).

Further, as shown in FIG. 20, the support walls 432*b* and 432*c* have first walls 432*b*1 and 432*c*1 and second walls 432*b*2 and 432*c*2, respectively, and the first walls 432*b*1 and 432*c*1 and the second walls 432*b*2 and 432*c*2 are arranged at predetermined intervals in the extending direction of the main body 432*a* (the left-right direction in FIG. 20). The predetermined interval is set slightly larger than the dimension of a roller R described later in the width direction (the left-right direction in FIG. 20). As shown in FIG. 20, the first walls **432*b*1 and 432*c*1 and the second walls 432*b*2 and 432*c*2, respectively, have a through-hole 433*b* penetrating in the horizontal direction (the left-right direction in FIG. 20). A fulcrum shaft 439 is inserted into the through-hole 433*b*. The roller R is rotatably supported between the first walls 432*b*1 and 432*c*1 and the second walls 432*b*2 and 432*c*2 by the fulcrum shaft 439. Here, the roller R may be supported rotatably with respect to the fulcrum shaft 439, or the roller R may be integrally attached to the fulcrum shaft 439, or the roller R may be integrally rotated with the fulcrum shaft 439. As shown in FIG. 20, the roller R protrudes toward the support 434 (the lower side in FIG. 20) from the surface 432*d* of the fixture 432 on the side where the support 434 is arranged. The fulcrum shaft 439** corresponds to the "first fulcrum shaft," "second fulcrum shaft," and "third fulcrum shaft" of the present invention, and the roller R is an example of an embodiment corresponding to the "first roller," "second roller," and "third roller" of the present invention.

As shown in FIG. 19, the support 434 includes a main body **434*a* and a protruding piece 434*b* integrated with a main body 434*a* orthogonally and has a substantially L-shape when viewed from the side (viewed from the direction perpendicular to the plane of FIG. 19). The support 434** is an example of an embodiment corresponding to the "first support," "second support," and "third support" of the present invention.

Figure 21:
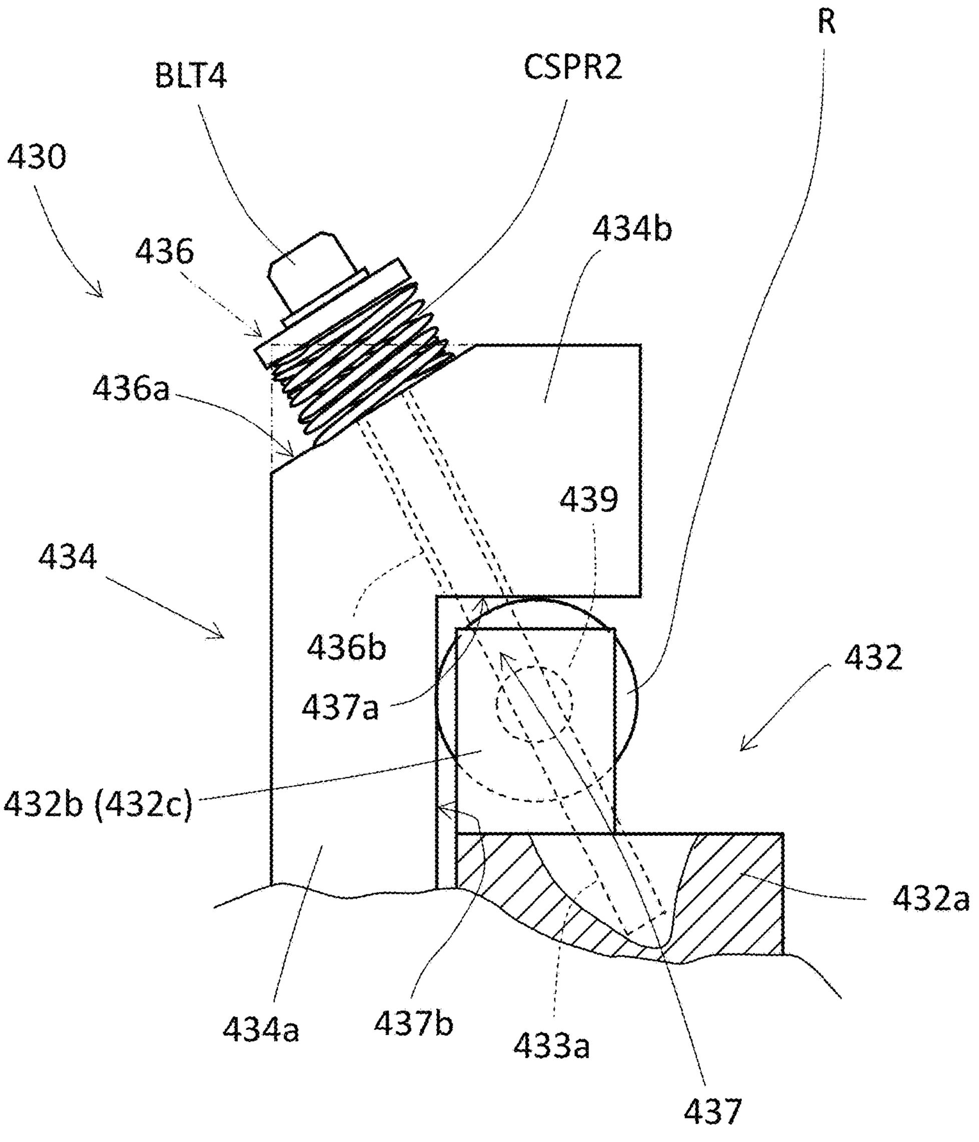
FIG. 21 is an enlarged view of the main part of the support member 430 according to a modification.

As shown in FIG. 21, at the intersection (outer corner) 436 between the main body **434*a* and the protruding piece 434*b*, an inclined surface 436*a* lies, and a through-hole 436*b* is located from the inclined surface 436*a* toward an inner corner 437**.

As shown in FIG. 21, the support 434 is fixed to the fixture 432 in a state where the inner wall surfaces **437*a* and 437*b* on the inner corner 437 side are respectively in contact with the rollers R, R supported by the support walls 432*b* and 432*c*. Specifically, the support 434 allows the bolt BLT4 to be inserted into the through-hole 436*b* in a state where the inner wall surfaces 437*a*, 437*b* are in contact with the two rollers R, R, respectively, and the support 434 is supported by the fixture 432 using the bolt BLT4 engaged with a screw hole 433*a* in the fixture 432. Here, a compression coil spring CSPR2 is arranged between the head of the bolt BLT4 and the inclined surface 436*a*. That is, the support 434 is supported by the fixture 432 in a state where the inner wall surfaces 437*a* and 437*b* are urged toward the rollers R and R by the compression coil spring CSPR2. The compression coil spring CSPR2 corresponds to the "fifth urging member," "sixth urging member," and "eleventh urging member," and the bolt BLT4** is an example of an embodiment corresponding to the "first bolt," "second bolt," and "third bolt" of the present invention.

The knife carriage 10 using the support member 430 of the present modification provides the effects similar to those from the knife carriage 10 using the support member 30 according to the present embodiment. For example, when the knife Kn peels a knot part of the log PW or when a fragment or chip of the log PW enters the cutting edge, the pressure bar 20 does not deform uniformly, but the portion of the nosebar 20 pressing where the knot part Sp is present or the portion of the nosebar 20 corresponding to the location where the fragment or chip of the log PW enters the cutting edge can be greatly deformed, while the deformation amount (the amount of movement) of the nosebar 20 in the other portions can be kept small: as a result, it is possible to achieve both the securing of the appropriate pressing force against the peeled portion 90 by the nosebar 20 and the suppression of excessive pressing against the peeled portion 90 by the nosebar 20. As another effect, the occurrence of scratches onto the peeled veneer Ven is well prevented, the scratches being caused when a corner of the nosebar 20 (specifically, the portion where three ridges of the tip TP attached to the nosebar 20 intersect) comes into contact with the peeled portion 90 of the log PW. Further, no gap is generated when the nosebar 20 is bent and deformed, and thereby, even when a veneer Ven is peeled from the log PW containing water, the water seeping from the peeled portion 90 due to the pressing against the peeled portion 90 by the nosebar 20 does not flow out to the veneer Ven.

Figure 22:
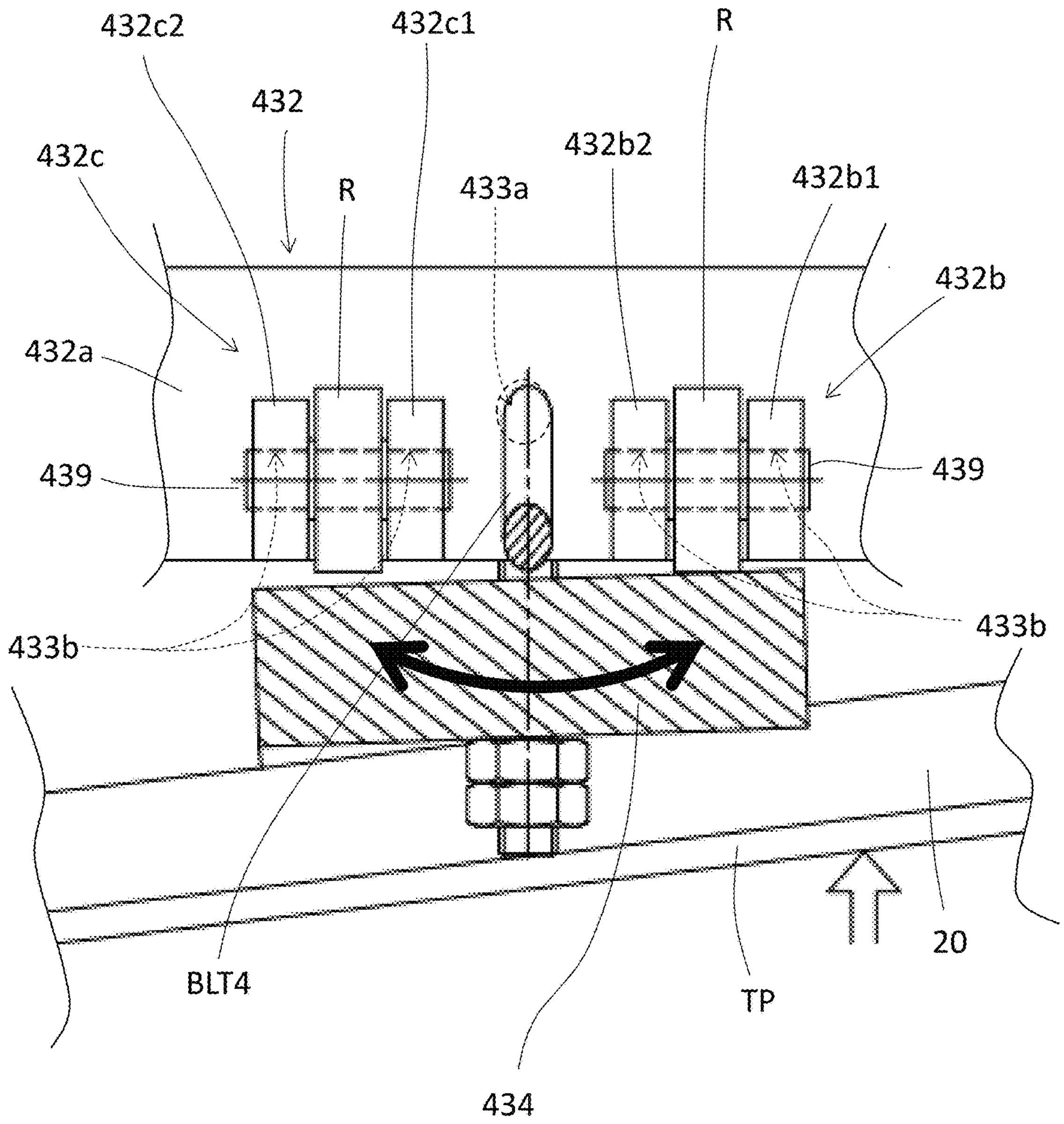
FIG. 22 is an explanatory diagram illustrating a state in which a support 434 swings away from one of rollers R, R.
Figure 23:
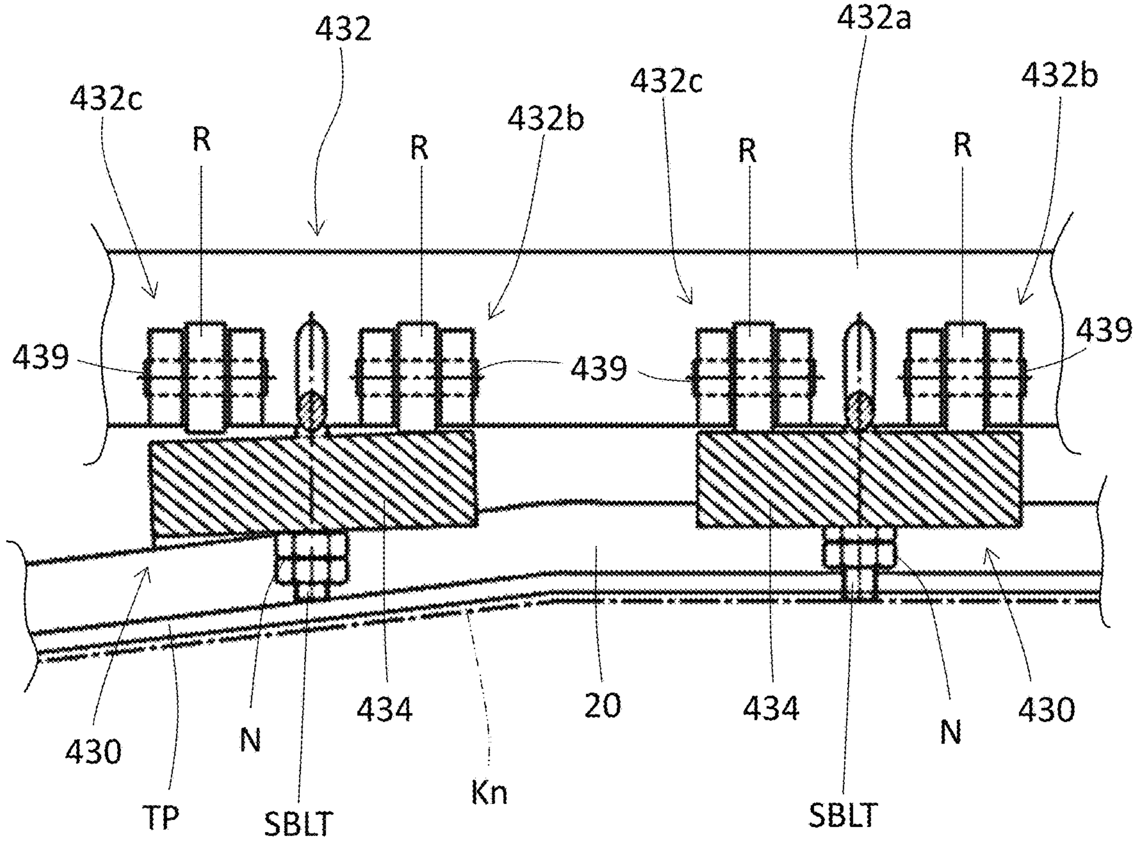
FIG. 23 is an explanatory view illustrating a state in which a reaction force of a pressing force acts on the support 434 via the nosebar 20.
Figure 24:
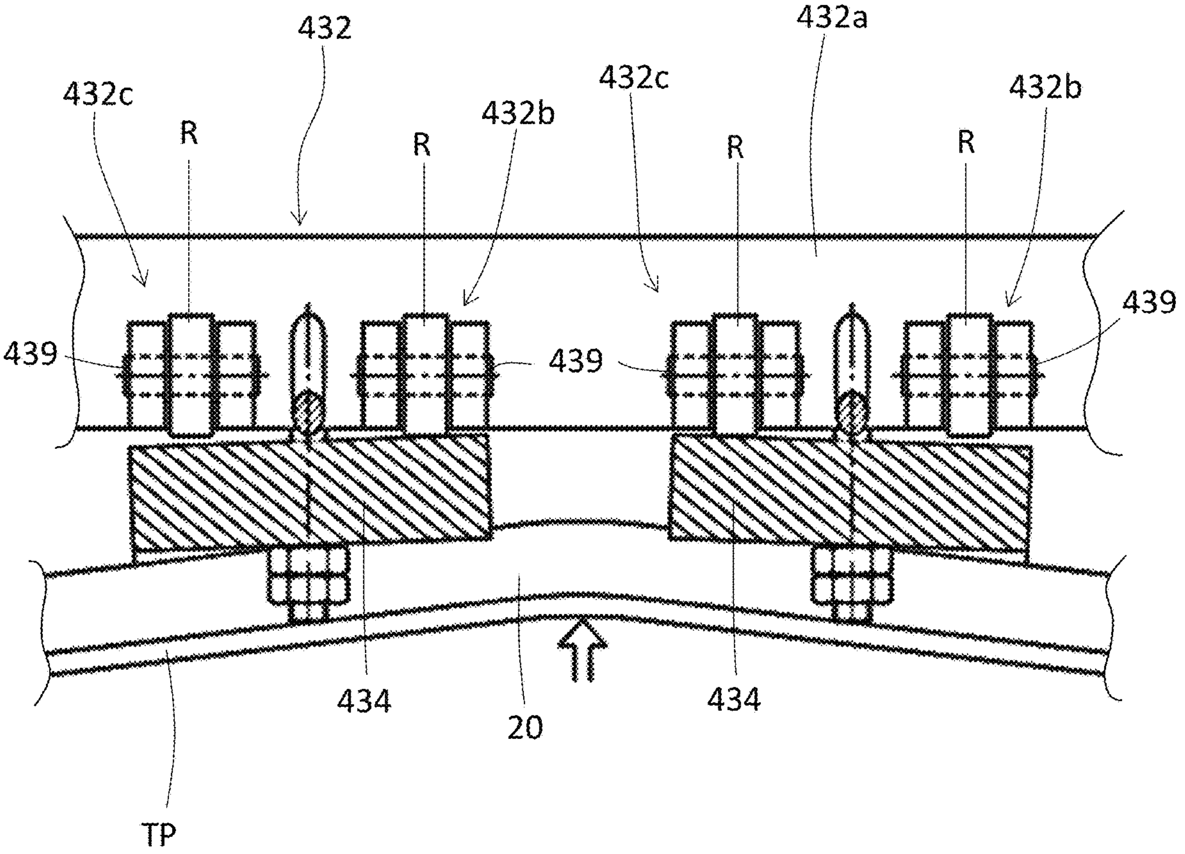
FIG. 24 is an explanatory view illustrating a state in which a reaction force of a pressing force acts on the support 434 via the nosebar 20.

In the support member 430 of the present modification, since the support 434 is only urged by the rollers R, R by the urging force of the compression coil spring CSPR2, the support 434 is able to not only swing about the fulcrum shaft 439 with respect to the fixture 432 (swinging in the direction of arrow SD in FIG. 19) and also swing in a direction away from one of the rollers R, R as shown in FIGS. 22 to 24. As a result, the nosebar 20 can be more flexibly deformed, so that an appropriate pressing force of the nosebar 20 can be realized more effectively.

Further, according to the support member 430 of the modification, since the support 434 can swing away from one of the rollers R, R, the positional relationship between the tip TP attached to the nosebar 20 and the knife Kn can be adjusted more flexibly by controlling the degree of engagement (screw amount) of the nut N. For example, by tightening the nut N of the right support member 430 in FIG. 23, the support 434 of the left support member 430 in FIG. 23 can be inclined such that the contact with the roller R far from the right support member 430 in FIG. 23 is released, while the contact with the roller R closer to the right support member 430 in FIG. 23 is maintained. Thus, the nosebar 20 can be deformed to follow the shape of the bent knife Kn as shown in FIG. 23.

In the support members 30, 330, and 430 of the present embodiment and the modifications described above, the supports 34 and 434 are configured to swing, but the configuration is not limited thereto. For example, as illustrated in a support member 530 of a modification shown in FIG. 25, a support 534 may be configured to move in a substantially horizontal direction with respect to a fixture 532.

Figure 25:
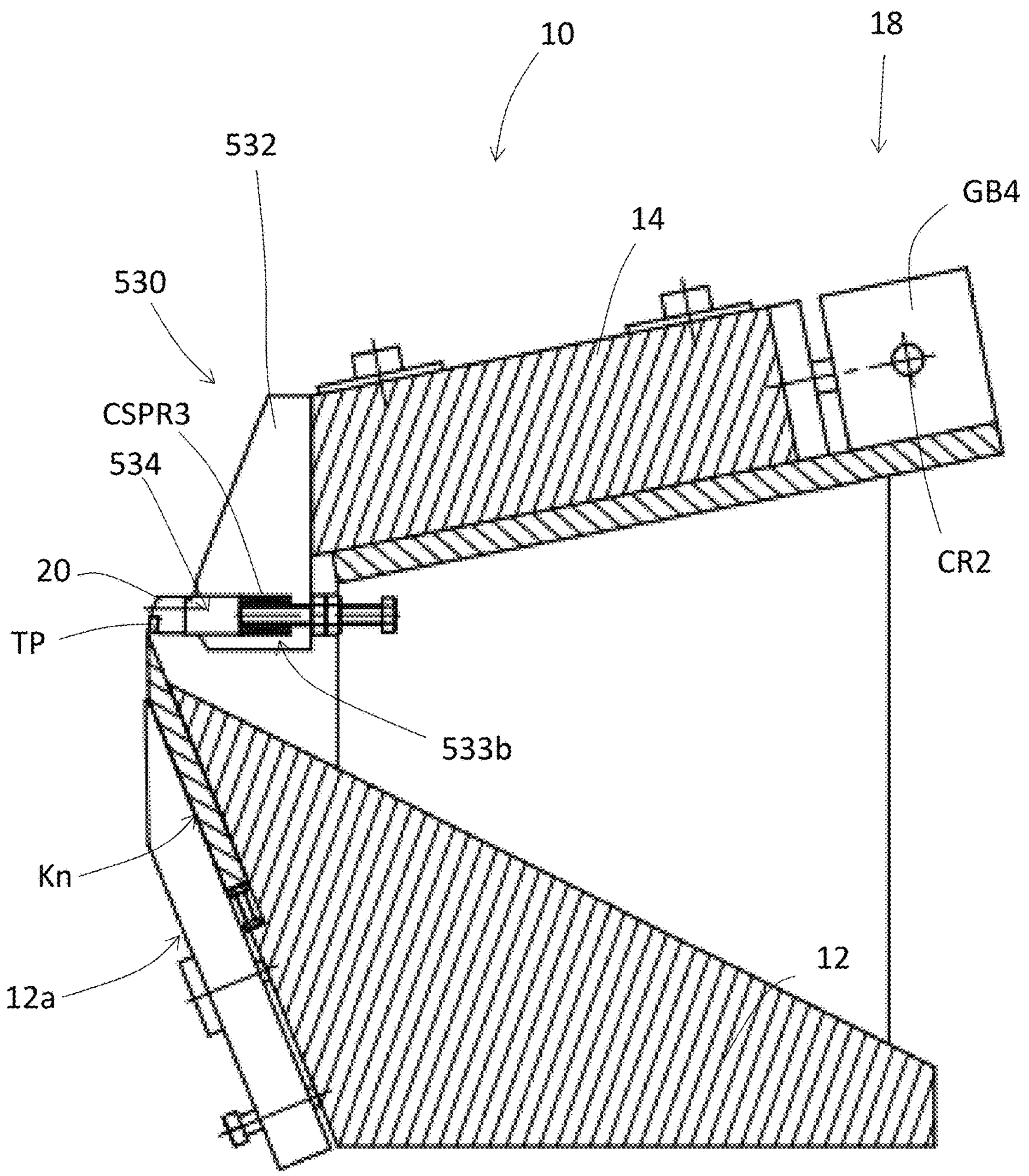
FIG. 25 is an explanatory view schematically illustrating a configuration of the knife carriage 10 including a support member 530 of a modification.

As shown in FIG. 25, the fixture 532 of the modification has a cylindrical concave portion **533*b* that can accommodate a compression coil spring CSPR3 and a support 534. Further, the support 534 of the present modification is configured as a piston member slidable in the cylindrical concave portion 533*b*, and the nosebar 20 is attached to a distal end of the support 534 in the sliding direction. The support 534 corresponds to the "first support," "second support," and "third support" of the present invention, and the compression coil spring CSPR3** is an example of an embodiment corresponding to the "seventh urging member," "eighth urging member," and "twelfth urging member" of the present invention.

The knife carriage 10 using the support member 530 of the present modification provides the effects similar to those from the knife carriage 10 using the support member 30 according to the present embodiment. For example, when the knife Kn peels a knot part Sp of the log PW or when a fragment or chip of the log PW enters the cutting edge, the pressure bar 20 does not deform uniformly, but the portion of the nosebar 20 pressing where the knot part Sp is present in the log PW or the portion of the nosebar 20 corresponding to the location where the fragment or chip of the log PW enters the cutting edge can be greatly deformed, while the deformation amount (the amount of movement) of the nosebar 20 in the other portions can be kept small: as a result, it is possible to achieve both the securing of the appropriate pressing force against the peeled portion 90 by the nosebar 20 and the suppression of excessive pressing against the peeled portion 90 by the nosebar 20. As another effect, the occurrence of scratches onto the peeled veneer Ven is well prevented, the scratches being caused when a corner of the nosebar 20 (specifically, the portion where three ridges of the tip TP attached to the nosebar 20 intersect) comes into contact with the peeled portion 90 of the log PW. Further, no gap is generated when the nosebar 20 is bent and deformed, and thereby, even when a veneer Ven is peeled from the log PW containing water, the water seeping from the peeled portion 90 due to the pressing against the peeled portion 90 by the nosebar 20 does not flow out to the veneer Ven.

In the support members 30, 330, 430, and 530 of the present embodiment and the above-described modifications, the compression coil spring CSPR, CSPR3 disposed between the supports 34, 334, 434, 534 and the fixtures 32, 332, 432, 532, or the spring force (restoring force) of the extension coil spring PSPR causes the nosebar 20 to press the peeled portion 90, but the present invention is not limited thereto. For example, by connecting a fluid cylinder to the supports 34, 334, 434, 534, a pressing force against the peeled portion 90 by the nosebar 20 may be generated.

In the support members 30, 330, 430, and 530 of the present embodiment and the above-described modifications, the supports 34, 334, 434, and 534 (nosebar 20) are assembled to the fixtures 32, 332, 432, and 532 so as to swing or move in a direction away from the log PW and return to the original position (posture) by the spring force (restoring force) of the compression coil springs CSPR, CSPR3 or the tension coil springs PSPR, but the present invention is not limited to the configuration. For example, as illustrated in a support member 630 of a modification shown in FIG. 26, a support 634 may be attached to a fixture 632 so that the support 634 can bend in a direction away from the log PW, and the support 634 returns to the original position (posture) by its elasticity.

Figure 26:
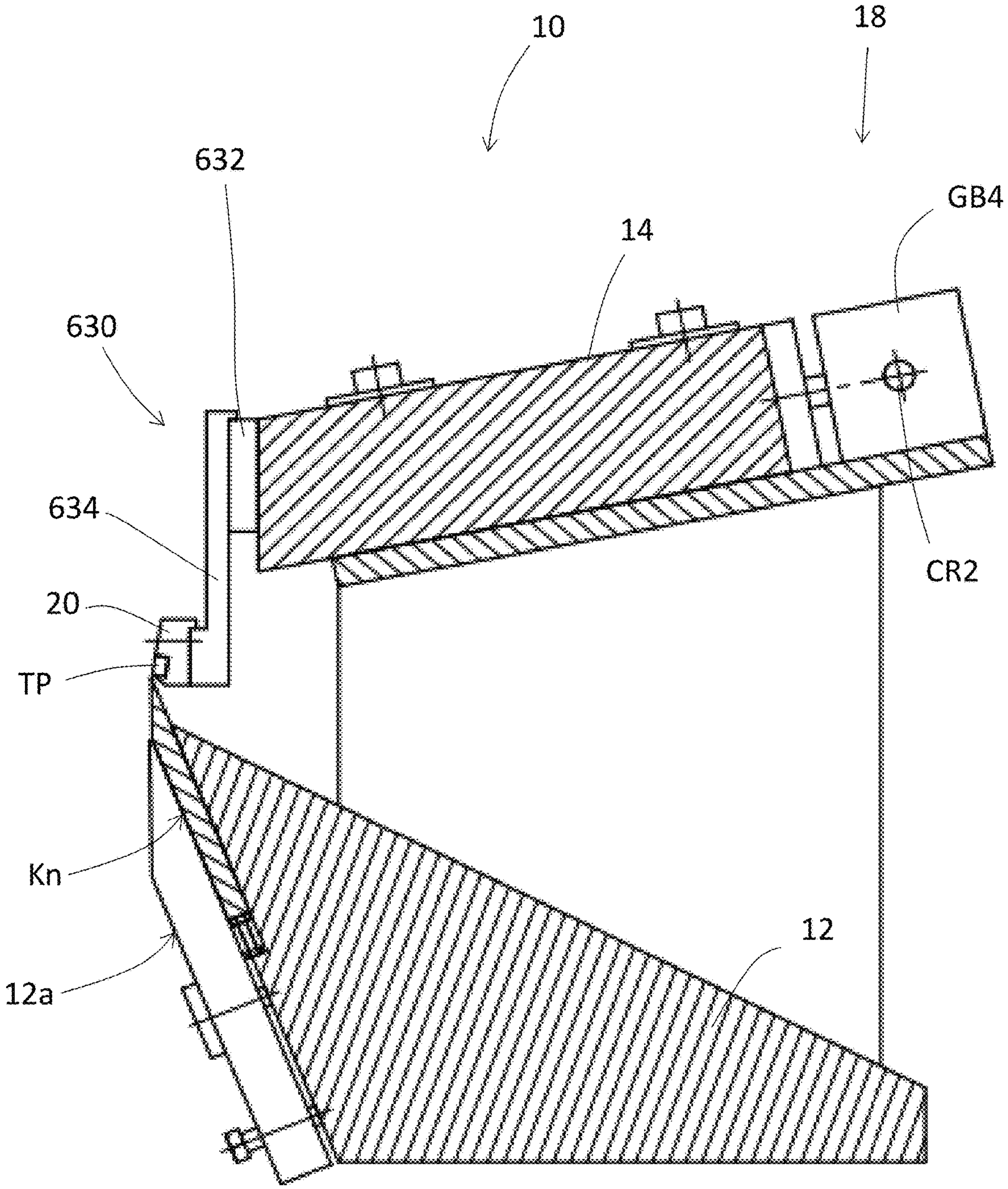
FIG. 26 is an explanatory view schematically illustrating a configuration of the knife carriage 10 including a support member 630 of a modification.

As shown in FIG. 26, the support 634 of the modification is supported in a cantilevered state by a fixture 632 fixed to the nosebar mount 14, and the nosebar 20 is attached to its free end. The support 634 is able to press the peeled portion 90 of the log PW with an appropriate pressing force. The nosebar 20 is bent in a direction away from the log PW when the knife Kn peels a knot part of the log PW or when a fragment or chip of the log PW enters the cutting edge, and has a bending rigidity (flexural rigidity) capable of suppressing excessive pressing against the peeled portion 90 by the nosebar 20. The bending rigidity of the nosebar 20 in the direction in which the peeled portion 90 of the log PW is pressed and the direction away from the peeled portion 90 is smaller than the bending rigidity (flexural rigidity) of the support 634. Note that even if the support 634 is bent in a direction away from the peeled portion 90, the support 634 can return to the original position (posture) by the elastic force of the support 634 itself. The support 634 is an example of an embodiment corresponding to the "first support," "second support," and "third support" of the present invention. The bending rigidity (flexural rigidity) is an example of an embodiment corresponding to the "movement rigidity" of the present invention. The portion of the support 634 fixed to the fixture 632 corresponds to the "fifth end," "sixth end," and "eleventh end" of the present invention, and the free end of the support 634 to which the nosebar 20 is attached is an example of an embodiment corresponding to the "seventh end," "eighth end," and "twelfth end" of the present invention.

The knife carriage 10 using the support member 630 of the present modification provides the effects similar to those from the knife carriage 10 using the support member 30, 330, 530 according to the present embodiment. For example, when the knife Kn peels a knot part Sp of the log PW or when a fragment or chip of the log PW enters the cutting edge, the pressure bar 20 does not deform uniformly, but the portion of the nosebar 20 pressing where the knot part Sp is present or the portion of the nosebar 20 corresponding to the location where the fragment or chip of the log PW enters the cutting edge can be greatly deformed, while the deformation amount (the amount of movement) of the nosebar 20 in the other portions can be kept small: as a result, it is possible to achieve both the securing of the appropriate pressing force against the peeled portion 90 by the nosebar 20 and the suppression of excessive pressing against the peeled portion 90 by the nosebar 20. As another effect, the occurrence of scratches onto the peeled veneer Ven is well prevented, the scratches being caused when a corner of the nosebar 20 (specifically, the portion where three ridges of the tip TP attached to the nosebar 20 intersect) comes into contact with the peeled portion 90 of the log PW. Further, no gap is generated when the nosebar 20 is bent and deformed, and thereby, even when a veneer Ven is peeled from the log PW containing water, the water seeping from the peeled portion 90 due to the pressing against the peeled portion 90 by the nosebar 20 does not flow out to the veneer Ven.

In the support member 630 of the modification described above, the support 634 bent in the direction away from the peeled portion 90 returns to the original position (posture) by the elastic force of the support 634 itself, but the present invention is not limited thereto. For example, as shown in a support member 630A of a modification illustrated in FIG. 27, a coil spring CSPR may be positioned between the free end of the support 634 where the nosebar 20 is attached and a fixture 632A, so that the support 634 bent in the direction away from the peeled portion 90 returns to the original position (posture) by the spring force (restoring force) of the coil spring CSPR.

Figure 27:
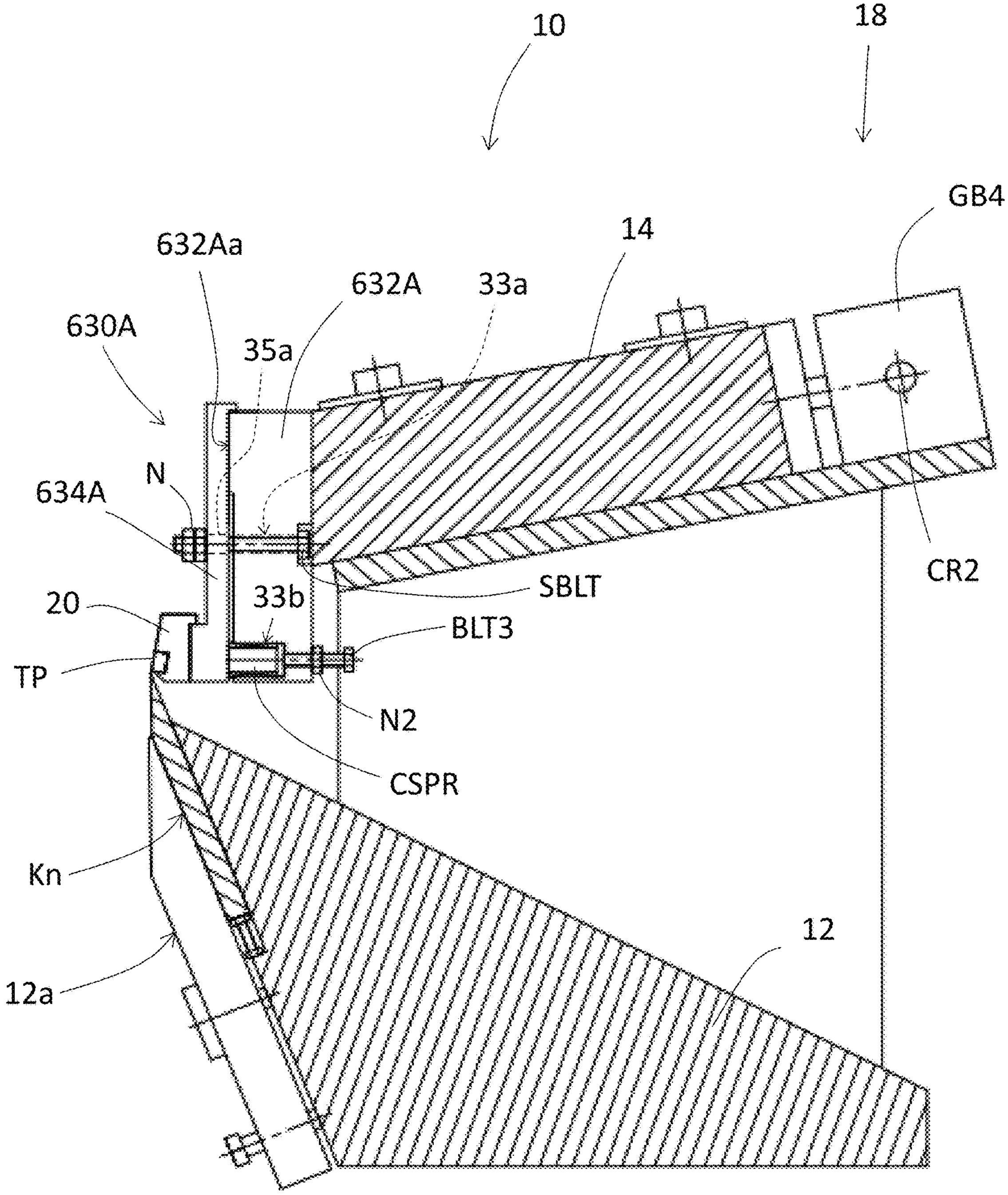
FIG. 27 is an explanatory view schematically illustrating a configuration of the knife carriage 10 including a support member 630A of a modification.

As shown in FIG. 27, the support 630A of the modification includes the fixture 632A fixed to the nosebar mount 14, and a support 634A cantilevered by the fixture 632A. The fixture 632A has a rectangular shape that is long in the vertical direction when viewed from one side (the left side in FIG. 27) in a direction orthogonal to both the arrangement direction of the supports 630A (the extending direction of the nosebar mount 14, the direction perpendicular to the plane of FIG. 27) and the vertical direction (the up-down direction in FIG. 27). The fixture 632A has a length in the vertical direction (the vertical direction in FIG. 27) that is substantially the same as the length of the support 634A in the vertical direction (the up-down direction in FIG. 27). Further, the fixture 632A has a protruding surface 632Aa. The protruding surface 632Aa is located on the opposite side to the surface of the fixture 632A that comes into contact with the nosebar mount 14. The protruding surface 632Aa is disposed above the fixture 632A in the vertical direction (the up-down direction in FIG. 27). Further, similarly to the fixture 32 of the support member 30 of the present embodiment described above, the fixture 632A includes a stepped hole 33*a* disposed substantially at the center of the main body 632Aa of the fixture 632A and a pair of stepped holes 33*b*, 33*b* arranged at the lower end of the main body 632Aa (the lower end in FIG. 27).

As shown in FIG. 27, similarly to the above-described support member 30 of the present embodiment, the stepped hole 33*a* accommodates a stopper bolt SBLT therein, and the pair of stepped holes 33*b*, 33*b* accommodates a compression coil springs CSPR and the bolts BLT3 screwed therewith. Here, the spring constant of the compression coil springs CSPR is set to a value such that the peeled portion 90 of the log PW can be pressed with an appropriate pressing force when the veneer Ven is peeled from the log PW by the knife Kn, and the nosebar 20 moves away from the log PW and excessive pressing against the peeled portion 90 by the nosebar 20 is suppressed when the knife Kn peels a knot part of the log PW or when a fragment or chip of the log PW enters the cutting edge. Further, the bending rigidity of the nosebar 20 in the direction in which the peeled portion 90 of the log PW is pressed and in the direction away from the peeled portion 90 is smaller than the spring constant of the compression coil springs CSPR.

The support 634A has the same configuration as the support 634 of the support member 630 of the above-described modification, except that the support 634A has a through-hole 35*a* substantially at the center, as shown in FIG. 27. The through-hole 35*a* is the same as the through-hole 35*a* of the support 34 of the support member 30 of the present embodiment described above. The support 634A is cantilevered by the fixture 632A while being urged in a direction away from the fixture 632A by the spring force (restoring force) of the compression coil spring CSPR. More specifically, the upper end of the support 634*a* in the vertical direction (the up-down direction in FIG. 27) is fixed to the protruding surface 632Aa of the fixture 632A, and is supported by the fixed portion 632*a* in a state where the free end which is the lower end to which the nosebar 20 is attached is urged away from the fixed portion 632A by the compression coil spring CSPR. The spring force (restoring force) of the compression coil spring CSPR is adjusted to a desired value by adjusting the degree of engagement (screw amount) of the bolt BLT3. Note that the tip TP and the knife Kn are adjusted to be parallel to each other at a desired distance by adjusting the degree of engagement (screw amount) of the nut N screwed to the stopper bolt SBLT. The portion of the support 634A that is fixed to the fixture 632A corresponds to the “fifth end,” “sixth end,” and “eleventh end” of the present invention, and the free end of the support 634 where the nosebar 20 is attached is an example of an embodiment corresponding to the “seventh end,” “eighth end,” and “twelfth end” of the present invention.

The knife carriage 10 using the support member 630A of the present modification provides the effects similar to those from the knife carriage 10 using the support member 630 according to the above modification. For example, when the knife Kn peels a knot part Sp of the log PW or when a fragment or chip of the log PW enters the cutting edge, the pressure bar 20 does not deform uniformly, but the portion of the nosebar 20 pressing where the knot part Sp is present in the log PW or the portion of the nosebar 20 corresponding to the location where the fragment or chip of the log PW enters the cutting edge can be greatly deformed, while the deformation amount (the amount of movement) of the nosebar 20 in the other portions can be kept small: as a result, it is possible to achieve both the securing of the appropriate pressing force against the peeled portion 90 by the nosebar 20 and the suppression of excessive pressing against the peeled portion 90 by the nosebar 20. As another effect, the occurrence of scratches onto the peeled veneer Ven is well prevented, the scratches being caused when a corner of the nosebar 20 (specifically, the portion where three ridges of the tip TP attached to the nosebar 20 intersect) comes into contact with the peeled portion 90 of the log PW. Further, no gap is generated when the nosebar 20 is bent and deformed, and thereby, even when a veneer Ven is peeled from the log PW containing water, the water seeping from the peeled portion 90 due to the pressing against the peeled portion 90 by the nosebar 20 does not flow out to the veneer Ven. Furthermore, when the knot part Sp stops contacting the nosebar 20, the support 634*a* swings in a direction approaching the log PW by the spring force (restoring force) of the compression coil spring CSPR, and the nosebar 20 returns to the original position (posture), and thereby an appropriate pressing force against the peeled portion 90 by the nosebar 20 are reliably secured.

In the present embodiment and the above-described modification, the rotary veneer lathe 1 has the fixtures 32, 332, 432, 532, and 632 separate from the nosebar mount 14, but the present invention is not limited thereto. For example, the fixtures 32, 332, 432, 532, and 632 may be integrally formed with the nosebar mount 14. In this case, the portion of the nosebar mount 14 for swingably supporting the supports 34, 334, 434, 534, 634 is an example of an embodiment corresponding to the “fixture” of the present invention.

In the present embodiment and the above-described modifications, the support members 30, 330, 430, 530, and 630 have a plurality of fixtures 32, 332, 432, 532, and 632, and each of the fixtures 32, 332, 432, and 632 is configured to swingably support the supports 34, 334, 434, 534, 634, but the present invention is not limited thereto. For example, the support members 30, 330, 430, 530, and 630 may have only one fixture 32, 332, 432, 532, 632, and the one fixture 32, 332, 432, 532, 632 may be configured to swingably support the plurality of supports 34, 334, 434, 534, 634 at predetermined intervals in the extending direction of the nosebar mount 14. In this case, the fixture 32, 332, 432, 532, and 632 can have a long shape extending in the longitudinal direction of the nosebar 20, 120, and 220.

In the present embodiment and the above-described modifications, the nosebar 20, 120, and 220 are used as a pressure bar, but the present invention is not limited thereto. For example, a roller bar may be used as the pressure bar.

Figure 28:
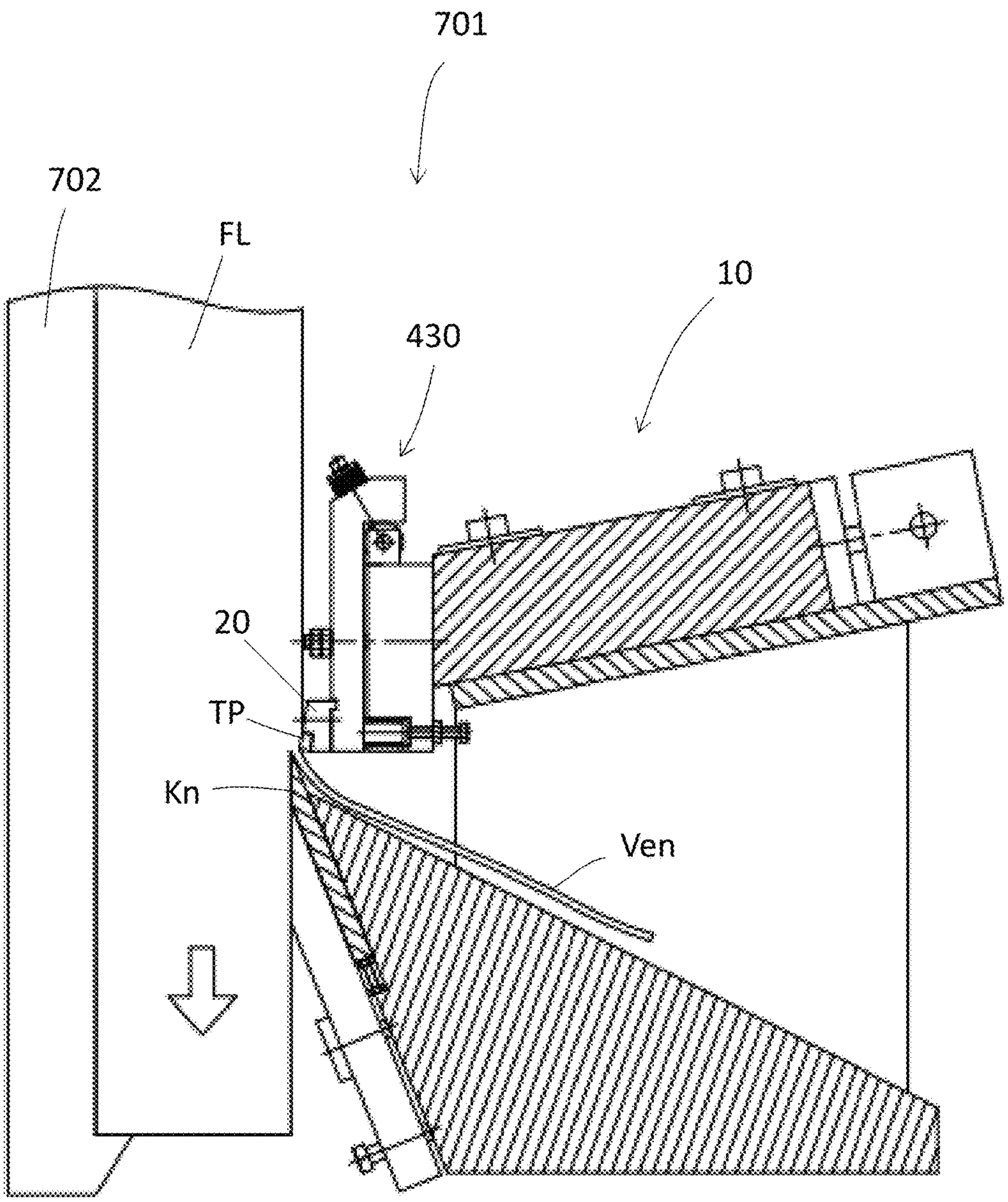
FIG. 28 is a schematic configuration diagram illustrating an outline of a configuration of a veneer slicer 701 including the knife carriage 10 according to an embodiment of the present invention.

The present embodiment and the above-described modification are applied to the rotary veneer lathe 1, but may be applied to the veneer slicer 701 as shown in FIG. 28. The veneer slicer 701 has substantially the same configuration as that of the rotary veneer lathe 1 of the present embodiment except that the pair of cutting spindles 2*a* and 2*b* is replaced with a holding member 702. That is, the veneer slicer 701 includes a pair of support frames 4*a* and 4*b* (see FIG. 1) having the holding member 702 capable of holding the wood FL, and a base frame 6 connecting the pair of support frames 4*a* and 4*b* (see FIG. 1) and the knife carriage 10 disposed on the base frame 6 (see FIG. 1) between the pair of support frames 4*a* and 4*b* (see FIG. 1). The veneer slicer 701 is a device that relatively moves the knife Kn and the wood FL to peel a veneer Ven. FIG. 28 discloses a configuration in which the knife carriage 10 has support members 430.

In the present embodiment and the above-described modification, a separate tip TP is attached to the nosebar 20. However, if the nosebar 20 is formed of the same material as that of the tip TP, a configuration without the tip TP may be adopted.

The present embodiment shows an example of a mode for carrying out the present invention. Therefore, the present invention is not limited to the configuration of the present embodiment. The correspondence between each component of the present embodiment and each component of the present invention is shown below.

REFERENCE SIGNS LIST

1 Rotary veneer lathe (Rotary veneer lathe)
2*a* Cutting spindle (Cutting spindle)
2*b* Cutting spindle (Cutting spindle)
3*a* Hydraulic cylinder
3*b* Hydraulic cylinder
4*a* Support frame (Machine frame, Vertical wall)
4*b* Support frame (Machine frame, Vertical wall)
6 Base frame (Machine frame, Pedestal)
10 Knife carriage (Knife carriage)
12 Knife mount (Knife mount)
12*a* Knife clamp
12*b* Inclined surface
14 Nosebar mount (Pressure bar mount)
16*a* Internal threaded body
16*b* Internal threaded body
18 Moving device
18*a* Internally threaded body
20 Nosebar (Pressure bar)
30 Support member (Support member)
32 Fixture (Fixture)
32*a* Main body
32*b* Protrusion
33*a* Stepped hole
33*b* Stepped hole
33*c* Stepped hole
33*d* Through-hole
34 Support (First support, Second support, Third support)
34*a* Main body
34*b* Holding part
35*a* Through-hole
35*b* Recess
35*c* Through-hole
35*d* Screw hole
39 Fulcrum shaft (First fulcrum shaft, Second fulcrum shaft, Third fulcrum shaft)
90 Peeled portion (Peeled portion)
120 Nosebar (Pressure bar, First pressure bar, Second pressure bar)
220 Nosebar (Pressure bar, First pressure bar, Second pressure bar)
330 Support member (Support member)
332 Fixture (Fixture)
332*c* Spring supporting wall
334 Support (First support, Second support, Third support)
334*c* Spring supporting wall (First extending portion, Second extending portion, Third extending portion)
430 Support member (Support member)
432 Fixture (Fixture)
432*a* Main body
432*b* Support wall
432*b*1 First wall
432*b*2 Second wall
432*c* Support wall
432*c*1 First wall
432*c*2 Second wall
432*d* Surface
433*a* Screw hole
433*b* Through-hole
434 Support (First support, Second support, Third support)
434*a* Main body
434*b* Protruding piece
436 Intersection
436*a* Inclined surface
436*b* Through-hole
437 Inner corner (Inner corner)
437*a* Inner wall surface
437*b* Inner wall surface
439 Fulcrum shaft (First fulcrum shaft, Second fulcrum shaft, Third fulcrum shaft)
530 Support member (Support member)
532 Fixture (Fixture)
533*b* Cylindrical concave portion
534 Support (First support, Second support, Third support)
630 Support member (Support member)
632 Fixture (Fixture)
634 Support (First support, Second support, Third support)
630A Support member (Support member)
632A Fixture (Fixture)
632Aa Protruding surface
634A Support (First support, Second support, Third support)
701 Veneer slicer (Veneer slicer)
702 Holding member (Holding member)
M1 Motor
M2 Motor
M3 Motor
PW Log (Log, Wood)
GB1 Gear box
GB2 Gear box
GB3 Gear box
GB4 Gear box
MSR1 Externally threaded rod
MSR2 Externally threaded rod
MSR3 Externally threaded rod
CR1 Connecting shaft
CR2 Connecting shaft
Ven Veneer (Veneer)
Kn Knife (Knife)
SBLT Stopper bolt
CSPR Compression coil spring (First urging member, Second urging member, Ninth urging member)
CSPR2 Compression coil spring (Fifth urging member, Sixth urging member, Eleventh urging member)
CSPR3 Compression coil spring (Seventh urging member, Eighth urging member, Twelfth urging member)
N Nut
TP Tip
Sp Knot part
PSPR Tension coil spring (Third urging member, Fourth urging member, Eleventh urging member)
ABLT Adjuster bolt
BLT1 Bolt
BLT2 Bolt
BLT3 Bolt
BLT4 Bolt (First bolt, Second bolt, Third bolt)
R Roller (First roller, Second roller, Third roller)

The invention claimed is:

1. A knife carriage in which a long knife and at least one long, unitary pressure bar are mounted, the knife being disposed to face wood including a log for peeling a veneer from the wood, the pressure bar configured to press a peeled portion of the veneer from a side opposite to the side where the knife is disposed with respect to the peeled portion, the knife carriage comprising:

a knife mount extending in a longitudinal direction of the knife for receiving the knife;

a pressure bar mount disposed above the knife and extending in the longitudinal direction of the knife for receiving the pressure bar; and a support member disposed between the pressure bar and the pressure bar mount for supporting the pressure bar, the support member including at least one fixture fixed to the pressure bar mount, a first support supported by the fixture so as to support one end of the pressure bar in a longitudinal direction of the pressure bar, and a second support supported by the fixture in a position separated from the first support in an extending direction of the pressure bar so as to support the other end of the pressure bar in the longitudinal direction, and the first and second supports being supported by the fixture to be movable independently of each other in a direction away from the wood according to the magnitude of a reaction force of a pressing force of the pressure bar against the peeled portion, the reaction force acting on the first and second supports via the pressure bar.

2. The knife carriage according to claim 1, wherein the support member further includes first and second fulcrum shafts for swingably supporting the first and second supports relative to the fixture, the first and second fulcrum shafts are arranged parallel to the longitudinal direction of the pressure bar, and the first and second supports include first and second ends that are supported by the first and second fulcrum shafts, third and fourth ends for supporting the pressure bar, and first and second connecting portions for connecting the first and second ends to the third and fourth ends.

3. The knife carriage according to claim 2, further comprising:

first and second urging members arranged between the third and fourth ends and the fixture and configured to urge the pressure bar in a direction away from the fixture via the first and second supports.

4. The knife carriage according to claim 2, wherein the first and second ends have first and second extending portions that extend on the side, with respect to the first and second fulcrum shafts, opposite to the side where the third and fourth ends are arranged, and between the first and second extending portions and the fixture, third and fourth urging members are arranged for urging the pressure bar in a direction away from the fixture via the first and second supports.

5. The knife carriage according to claim 2, wherein the first and second fulcrum shafts support first and second rollers, and the first and second supports have a substantially L-shape in which the first and second ends are orthogonally connected to the first and second connecting portions, and the first and second supports are arranged to be in contact with the first and second rollers at their internal corners respectively, and the support member includes first and second bolts capable of fastening the first and second supports to the fixture and further includes fifth and sixth urging members disposed between the first and second supports and the first and second bolts for urging the first and second supports toward the first and second rollers.

6. The knife carriage according to claim 1, further comprising;

seventh and eighth urging members arranged between the first and second supports and the fixture for urging the pressure bar in a direction away from the fixture via the first and second supports.

7. The knife carriage according to claim 1, wherein the first and second supports includes fifth and sixth ends that are fixed to the fixture and seventh and eighth ends that are free ends, without being fixed to the fixture, for supporting the pressure bar.

8. The knife carriage according to claim 1, wherein a movement rigidity of the first and second supports in the direction away from the wood is equal to or greater than a bending rigidity of the pressure bar.

9. The knife carriage according to claim 1, wherein the support member further includes a third support to be supported by the fixture at a position between the first and second supports, and the third support is configured to support the pressure bar and is supported by the fixture so as to be movable in a direction away from the wood according to the magnitude of a reaction force of a pressing force acting on the third support via the pressure bar.

10. The knife carriage according to claim 9, wherein the support member further includes a third fulcrum shaft capable of swingably supporting the third support with respect to the fixture, the third fulcrum shaft is arranged parallel to the longitudinal direction of the pressure bar, and the third support includes a ninth end supported by the third fulcrum shaft, a tenth end capable of supporting the pressure bar, and a third connecting portion for connecting between the ninth end and the tenth end.

11. The knife carriage according to claim 10, further comprising a ninth urging member disposed between the tenth end and the fixture for urging the pressure bar in a direction away from the fixture via the third support.

12. The knife carriage according to claim 10, wherein the ninth end has a third extending portion that extends on a side opposite to a side where the tenth end is disposed with respect to the third fulcrum shaft, and the knife carriage further comprising a tenth urging member disposed between the third extending portion and the fixture for urging the pressure bar in a direction away from the fixture via the third support.

13. The knife carriage according to claim 10, wherein the third fulcrum shaft supports a third roller, the third support has a substantially L-shape in which the ninth end is orthogonally connected to the third connecting portion and is disposed so that an inner corner of the third support is in contact with the third roller, and the support member further includes a third bolt configured to fasten the third support to the fixture, and an eleventh urging member disposed between the third support and the third bolt for urging the third support toward the third roller.

14. The knife carriage of claim 9, further comprising a twelfth urging member disposed between the third support and the fixture for urging the pressure bar in a direction away from the fixture via the third support.

15. The knife carriage of claim 9, wherein the third support has an eleventh end that is fixed to the fixture, and a twelfth end that is a free end, without being fixed to the fixture, for supporting the pressure bar.

16. The knife carriage according to claim 9, wherein the moving rigidity of the third support in the direction away from the wood is set to be equal to or greater than the bending rigidity of the pressure bar.

17. The knife carriage according to claim 9, wherein the pressure bar comprises first and second pressure bars arranged in the longitudinal direction, the first support is configured to support one end of the first pressure bar in the longitudinal direction, the second support is configured to support one end of the second pressure bar in the longitudinal direction, and the third support is configured to support the other ends of the first and second pressure bars in the longitudinal direction.

18. The knife carriage according to claim 17, wherein the first and second pressure bars are supported by the third support in a state where the other ends of the first and second pressure bars in the longitudinal direction are in contact with each other.

19. A rotary veneer lathe for peeling out veneers from a log, the rotary veneer lathe comprising:

a pair of cutting spindles configured to hold a log therebetween, a machine frame having a pair of vertical walls that rotatably support the pair of cutting spindles, and a pedestal connecting between the pair of vertical walls, and a knife carriage according to claim 1, the knife carriage being arranged in a direction orthogonal to both of the axial direction of the pair of cutting spindles and the vertical direction so as to face the log held between the pair of cutting spindles.

20. A veneer slicer for peeling out veneers from the wood, the veneer slicer comprising:

a holding member configured to hold wood, a machine frame having a pair of vertical walls that support the holding member, and a pedestal connecting between the pair of vertical walls, and a knife carriage according to claim 1, the knife carriage being arranged to face the wood held by the holding member.

* * * * *